(12) United States Patent
Sekiai et al.

(10) Patent No.: US 8,978,386 B2
(45) Date of Patent: Mar. 17, 2015

(54) GAS TURBINE SYSTEM, CONTROL DEVICE FOR GAS TURBINE SYSTEM, AND CONTROL METHOD FOR GAS TURBINE SYSTEM

(75) Inventors: Takaaki Sekiai, Hitachinaka (JP); Kazuhito Koyama, Hitachi (JP); Shigeo Hatamiya, Hitachi (JP); Fumio Takahashi, Hitachi (JP); Naoyuki Nagafuchi, Naka (JP); Kazuo Takahashi, Hitachi (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 174 days.

(21) Appl. No.: 13/817,956

(22) PCT Filed: Sep. 30, 2010

(86) PCT No.: PCT/JP2010/067182
§ 371 (c)(1),
(2), (4) Date: Feb. 20, 2013

(87) PCT Pub. No.: WO2012/042655
PCT Pub. Date: Apr. 5, 2012

(65) Prior Publication Data
US 2013/0174549 A1   Jul. 11, 2013

(51) Int. Cl.
*F02C 3/20* (2006.01)
*F02C 3/30* (2006.01)
(Continued)

(52) U.S. Cl.
CPC .............. *F03G 6/02* (2013.01); *F01K 21/045* (2013.01); *F01K 21/047* (2013.01); *F02C 6/18* (2013.01); *F02C 7/1435* (2013.01); *F03G 6/064* (2013.01); *F24J 2/07* (2013.01); *Y02E 10/46* (2013.01)
USPC ............... 60/772; 60/39.3; 60/39.53; 60/726; 60/698

(58) Field of Classification Search
USPC .......... 60/39.3, 39.53, 39.511, 726, 728, 772, 60/641.8, 698
See application file for complete search history.

(56) References Cited

U.S. PATENT DOCUMENTS 5,398,497 A * 3/1995 Suppes ......................... 60/775
6,389,799 B1   5/2002 Hatamiya et al.
(Continued)

FOREIGN PATENT DOCUMENTS

JP   2000-345857 A   12/2000
JP   2001-214757 A    8/2001
(Continued)

OTHER PUBLICATIONS

Corresponding International Search Report with English Translation dated Nov. 22, 2010 (four (4) pages).
(Continued)

*Primary Examiner* — Hoang Nguyen
(74) *Attorney, Agent, or Firm* — Crowell & Moring LLP

(57) ABSTRACT

Provided is a gas turbine system capable of dealing with a request for output increase even when high-pressure hot water generated using solar thermal energy cannot be used according to the operating state of the gas turbine system. A gas turbine system which sucks in intake air from an air intake duct by a compressor and drives a gas turbine by combustion gas obtained by burning air and fuel by a combustor, said gas turbine system being provided with pipes for generating high-pressure hot water by providing a solar collecting tube that utilizes solar heat and spraying the high-pressure hot water into the intake air sucked in by the compressor, and pipes for spraying normal temperature water into the intake air sucked in by the compressor.

13 Claims, 13 Drawing Sheets

(51) Int. Cl.
    *F01K 21/04*  (2006.01)
    *F02C 6/18*   (2006.01)
    *F02C 7/143*  (2006.01)
    *F03G 6/02*   (2006.01)
    *F03G 6/06*   (2006.01)
    *F24J 2/07*   (2006.01)

(56) References Cited

U.S. PATENT DOCUMENTS

| | | | |
|---|---|---|---|
| 6,981,360 B2 * | 1/2006 | Yagi et al. | 60/39.5 |
| 7,520,137 B2 * | 4/2009 | Hoffmann et al. | 60/775 |
| 7,712,301 B1 * | 5/2010 | Wagner | 60/39.53 |
| 8,006,499 B2 * | 8/2011 | Koganezawa et al. | 60/775 |
| 8,151,549 B2 * | 4/2012 | Sasaki et al. | 60/39.511 |
| 2010/0154781 A1 | 6/2010 | Zhang et al. | |
| 2010/0175365 A1 | 7/2010 | Ota | |

FOREIGN PATENT DOCUMENTS

| | | |
|---|---|---|
| JP | 2008-39367 A | 2/2008 |
| JP | 2009-174542 A | 8/2009 |
| JP | 2010-144725 A | 7/2010 |
| WO | WO 98/48159 A1 | 10/1998 |
| WO | WO 2012/025967 A1 | 3/2012 |
| WO | WO 2012/042628 A1 | 4/2012 |
| WO | WO 2012/042638 A1 | 4/2012 |
| WO | WO 2012/042639 A1 | 4/2012 |
| WO | WO 2012/042652 A1 | 4/2012 |

OTHER PUBLICATIONS

Japanese—language Written Opinion dated Nov. 22, 2010 (PCT/ISA/237) (three (3) pages).

* cited by examiner

FIG.4

| NAME OF VALVE / NAME OF PUMP | CONTROL MODE A OF USING HIGH PRESSURE HOT WATER | | | CONTROL MODE B OF USING NORMAL TEMPERATURE WATER | |
|---|---|---|---|---|---|
| | ⟨SUB-MODE A1⟩ DIRECTLY SUPPLY HIGH PRESSURE HOT WATER TO ATOMIZER WITHOUT STORING IN THERMAL STORAGE | ⟨SUB-MODE A2⟩ SUPPLY MOST OF HIGH PRESSURE HOT WATER TO ATOMIZER WHILE PARTIALLY STORING IN THERMAL STORAGE | ⟨SUB-MODE A3⟩ SUPPLY HIGH PRESSURE HOT WATER FROM BOTH SOLAR COLLECTOR AND THERMAL STORAGE TO ATOMIZER | ⟨SUB-MODE B1⟩ STORE HIGH PRESSURE HOT WATER IN THERMAL STORAGE | ⟨SUB-MODE B2⟩ NOT STORE HIGH PRESSURE HOT WATER IN THERMAL STORAGE |
| FLOW RATE ADJUSTING VALVE 24A | OPEN | OPEN | OPEN | OPEN | CLOSE |
| FLOW RATE ADJUSTING VALVE 29 | OPEN | OPEN | OPEN | CLOSE | CLOSE |
| FLOW RATE ADJUSTING VALVE 41 | CLOSE | OPEN | OPEN | OPEN | CLOSE |
| FLOW RATE ADJUSTING VALVE 43 | CLOSE | CLOSE | OPEN AS NECESSARY | CLOSE | CLOSE |
| FLOW RATE ADJUSTING VALVE 24B | CLOSE | CLOSE | CLOSE | OPEN | OPEN |
| PUMP 22A | OPERATE | OPERATE | OPERATE | OPERATE | STOP |
| PUMP 42 | STOP | STOP | OPERATE AS NECESSARY | STOP | STOP |
| PUMP 22B | STOP | STOP | STOP | OPERATE | OPERATE |

GAS TURBINE SYSTEM, CONTROL DEVICE FOR GAS TURBINE SYSTEM, AND CONTROL METHOD FOR GAS TURBINE SYSTEM

TECHNICAL FIELD

The present invention relates to a gas turbine system, a control device for the gas turbine system, and a control method for the gas turbine system, wherein solar heat energy is used for a gas turbine.

BACKGROUND ART

In recent years, it is required to reduce emission of carbon dioxide ($CO_2$), which is one of the global warming materials, as much as possible. In this trend, hydraulic energy, wind energy, geothermal energy, solar (light/heat) energy, and the like are representative examples of renewable energy, wherein particularly as an electric power generation system that uses solar heat, a system that drives a steam turbine by steam generated by collecting heat with a heat collector is common. For example, Patent Literature 1 discloses a conventional art of this kind.

On the other hand, a gas turbine system is an electric power generation system that uses fossil resource, such as natural gas and petroleum as a fuel.

On gas turbine systems, it is known that the intake air amount at a compressor decreases under conditions where the atmospheric temperature increases in summer season or the like, and the output of a gas turbine also drops accordingly. As means for reducing a drop in output of a gas turbine system accompanying an increase in the atmospheric temperature, there are technologies, for example, disclosed by Patent Literatures 2 and 3. The technologies disclosed by Patent Literatures 2 and 3 are concretely gas turbine systems with an HAT (Humid Air Turbine) cycle, which is a kind of a renewal cycle, that is configured, including an after cooler at the compressor outlet in a renewal cycle in the cycle, a humidifier for humidifying compressed air at the compressor outlet, a heat exchanger for heating water to be supplied to the humidifier, and the like, wherein disclosed is a technology for atomizing high pressure hot water, which is produced by an after cooler, a heat exchanger, and the like, from an atomiser arranged at the compressor inlet by flashing.

BACKGROUND ART DOCUMENTS

Patent Literatures

Patent Literature 1: JP 2008-39367 A
Patent Literature 2: JP 2001-214757 A
Patent Literature 3: International Publication WO98/48159

DISCLOSURE OF THE INVENTION

Problems to be Solved by the Invention

The above-described electric power generation system using solar heat requires a solar collector for collecting solar heat that is the heat source for steam. As solar collecting systems, there are various systems such as parabolic trough systems for solar collecting by collecting solar light, using a solar collecting tube installed in front of a curved mirror, tower systems which use a tower to collect solar light reflected by a number of planar mirrors called heliostat, and the like. However, whatever the solar collecting system may be, a solar collector (reflecting mirror) of a huge scale is necessary to efficiently drive a steam turbine, in other words, to drive a steam turbine by obtaining steam with a higher temperature, or to thus obtain a high power output of the steam turbine. This means that an extremely wide site is necessary to install a solar collector. For example, in a case of an electric power generation system with an output of 50 MW using solar heat, it is said that 1.2 square kilometers is necessary as the area for installing a solar collector.

On the other hand, evaluating an electric power generation system using solar heat from the point of view of the cost, as the scale of an installed solar collector (reflecting mirror) is huge, the ratio of cost of the solar collector to the whole system is actually in general approximately 80%. Accordingly, it is necessary to significantly reduce the scale of a solar collector to attain a reduction in cost, however, a reduction in the scale of a solar collector causes a problem against intended high efficiency and high output of a power generation system using solar heat.

Further, a technology, which atomizes normal temperature water to air in the air intake duct of a compressor to reduce a drop in output when the temperature of intake air increases, has the following problem.

From the point of view of a drop in temperature of intake air and the soundness of the compressor, it is desirable, inside a compressor, that generation of liquid droplets in a size causing erosion is prevented and atomized water is quickly evaporated. That is, in case of atomizing normal temperature water into intake air for the compressor, the temperature of the liquid droplets of the normal temperature water atomized by the heat absorption by the latent heat of evaporation becomes below the freezing temperature and the droplets easily freeze at the inlet portion of the compressor. Accordingly, the particle diameters of droplets after atomizing hardly become small and a state that quick evaporation inside the compressor cannot be expected may occur.

Accordingly, it is desirable that high pressure hot water is atomized into an air intake duct. For example, making use of the fact that approximately 70-80% of the amount of heat of a high pressure hot water with a temperature of 150-200° C. is the latent heat of evaporation, the hot water is subjected to sudden depressurizing from a high pressure state to the atmospheric pressure state to flash. In this case that a high pressure hot water flashes, changing from liquid droplets into particles is promoted so that the water can be quickly evaporated inside the compressor.

However, if fossil fuel is used to generate a high pressure hot water, the amount of carbon dioxide increases.

In this situation, considered is a gas turbine system that includes a compressor for compressing air, a combustor for combusting fuel by supplying the air compressed by the compressor, a gas turbine driven by combustion gas generated by the combustor, and a solar collector for generating a high pressure hot water by collecting solar heat, wherein the gas turbine system also includes an atomiser for atomizing the high pressure hot water generated by the solar collector to air taken into the compressor.

With such a configuration, it is possible to provide a gas turbine system using solar heat energy for which the scale of a solar collector, for example, the number of light collecting mirrors is significantly reduced and the site area necessary for installation of the heat collector is significantly reduced.

However, even with such a gas turbine system using solar heat energy, it may occur that high pressure hot water cannot be generated, using solar heat energy, due to shortage in the amount of insulation or that a system for generating a high pressure hot water, using solar heat energy, cannot be used due to dust removal from the solar collector, inspection, a trouble or the like. Accordingly, even in such a case, it is necessary to respond to a requirement for increasing the output of the gas turbine system with a high temperature of intake air of the compressor.

An object of the present invention is to provide a gas turbine system, a control device for the gas turbine system, and a control method for the gas turbine system which can satisfy a requirement for increasing output, matching with the operational state of the gas turbine system, even in case that a high pressure hot water generated by using solar heat energy cannot be used.

Means for Solving the Problems

In the invention according to claim 1, provided is a gas turbine system having a compressor for compressing intake air and discharging the air, a combustor for mixing and combusting the air discharged from the compressor and fuel, and a gas turbine driven by combustion gas from the combustor, the gas turbine system including: a high pressure hot water atomizing system using solar heat, wherein the atomizing system generates high pressure hot water by a solar collector using solar heat energy and atomizes the high pressure hot water from an atomizing nozzle into the air taken in by the compressor; and a normal temperature water atomizing system that atomizes normal temperature water from an atomizing nozzle into the air taken in by the compressor.

In the invention according to claim 3, provided is a control device for controlling operation of a gas turbine system, wherein the gas turbine system includes: a compressor for compressing intake air and discharging the air; a combustor for mixing and combusting the air discharged from the compressor and fuel; a gas turbine driven by combustion gas from the combustor; a high pressure hot water atomizing system using solar heat, wherein the atomizing system generates high pressure hot water by a solar collector using solar heat energy and atomizes the high pressure hot water from an atomizing nozzle into the air taken in by the compressor; and a normal temperature water atomizing system that atomizes normal temperature water from an atomizing nozzle into the air taken in by the compressor, the control device including: a high-pressure-hot-water generation-rate obtaining unit that measures a generation rate of high pressure hot water obtained by the solar collector; and an atomizing control mode determining unit that, based on at least a current generation rate of high pressure hot water, the current generation rate being obtained by the high-pressure-hot-water generation-rate obtaining unit, determines switching between a high pressure hot water atomizing mode of atomizing high pressure hot water from the high pressure hot water atomizing system using solar heat and a normal temperature water atomizing mode of atomizing normal temperature water from the normal temperature water atomizing system.

According to the invention as set forth in claims 1 and 3, even in case that the solar collector for generating high pressure hot water, using solar heat energy, cannot sufficiently generate high pressure hot water due to a shortage in solar heat, maintenance, or the like, switching to atomizing of normal temperature water to intake air for the compressor by the normal temperature water atomizing system. As a result, the gas turbine system becomes able to flexibly meet a demand for increasing gas turbine output.

In the invention according to claim 7, provided is a control method for a gas turbine system, wherein the gas turbine system includes at least: a compressor for compressing intake air and discharging the air; a combustor for mixing and combusting the air discharged from the compressor and fuel; a gas turbine driven by combustion gas from the combustor; an atomiser, the atomiser being installed inside an air intake chamber on an upstream side of the compressor, for atomizing water to air to be supplied to the compressor so that a temperature of the air to be supplied to the compressor decreases; a high pressure hot water supply piping that includes a solar collector for generating high pressure hot water by heating water to be supplied to the atomiser to a temperature higher than a temperature of the air to be supplied to the compressor, using solar heat; and a normal temperature water supply piping for supplying normal temperature water to the atomiser, wherein the gas turbine system includes a control device for controlling operation of the gas turbine system, wherein the control device includes: a high-pressure-hot-water generation-rate obtaining unit that measures a generation rate of high pressure hot water generated by the solar collector; and an atomizing control mode determining unit that, based on a current generation rate of high pressure hot water, the rate being obtained by the high-pressure-hot-water generation-rate obtaining unit, determines switching between a high pressure hot water atomizing mode of supplying high pressure hot water from the high pressure hot water supply piping using solar heat to the atomiser and a normal temperature water atomizing mode of supplying normal temperature water from the normal temperature water supply system to the atomiser, and wherein the atomizing control mode determining unit: predicts and computes a time length for which the solar collector can generate high pressure hot water that can be atomized at a certain atomization rate into intake air for the compressor, based on the current generation rate of high pressure hot water obtained by the high-pressure-hot-water generation-rate obtaining unit; and determines to apply the high pressure hot water atomizing mode when the predicted and computed time length is longer than or equal to a preset threshold time length, and determines to apply the normal temperature water atomizing mode when the predicted and computed time length is shorter than the preset threshold time length.

According to the invention as set forth in claim 7, even in case that the solar collector for generating high pressure hot water, using solar heat energy, cannot sufficiently generate high pressure hot water due to a shortage in solar heat, maintenance, or the like, switching to the normal temperature water atomizing mode of atomizing normal temperature water to intake air for the compressor by the normal temperature water atomizing system. As a result, the gas turbine system can be controlled to be able to flexibly meet a requirement to increase the gas turbine output.

In the invention according to claim 9, provided is a gas turbine system having a compressor for compressing intake air and discharging the air; a combustor for mixing and combusting the air discharged from the compressor and fuel; and a gas turbine driven by combustion gas from the combustor; the gas turbine system including: an atomiser, the atomiser being installed inside an air intake chamber on an upstream side of the compressor, for atomizing water to air to be supplied to the compressor so that a temperature of the air to be supplied to the compressor decreases; a high pressure hot water supply piping that includes a solar collector for generating high pressure hot water by heating water to be supplied to the atomiser to a temperature higher than a temperature of the air to be supplied to the compressor, using solar heat; a thermal storage for storing high pressure hot water generated by the solar collector, the thermal storage thermally maintaining the high pressure hot water, and a stored high pressure hot water supply piping for supplying the high pressure hot water stored in the thermal storage to the atomiser; a normal temperature water supply piping for supplying normal temperature water to the atomiser, as necessary; and a control device for controlling operation of the gas turbine system, wherein the atomiser includes: atomizing base pipes for atomizing the high pressure hot water or the normal temperature water from atomizing nozzles thereof into the air intake chamber, the atomizing base pipes being arranged along an air intake direction in the air intake chamber in plural stages; and a switching unit for switching between supply of the high pressure hot water and supply of the normal temperature water under control by the control device in supplying the high pressure hot water or the normal temperature water to the atomizing base pipes, and wherein the control device controls respective flow rates in the high pressure hot water supply piping using solar heat, the stored high pressure hot water supply piping, and the normal temperature water supply piping to thereby control supply amounts of the high pressure hot water and the normal temperature water, and controls the switching unit, corresponding to the respective supply amounts of the high pressure hot water and the normal temperature water, to thereby perform switching setting of the high pressure hot water and the normal temperature water to be supplied to the atomizing base pipes on the respective stages of the atomizing base pipes.

According to the invention as set forth in claim 9, even in case that high pressure hot water to be atomized to intake air for the compressor from the atomiser is insufficient for a required atomization rate of high pressure hot water due to a low generation rate of high pressure hot water generated by the solar collector or due to a small amount of high pressure hot water stored in the thermal storage, it is possible to atomize high pressure hot water by the atomizing base pipe and atomize normal temperature water from atomizing base pipe different from the atomizing base pipe for atomizing high pressure hot water. As a result, it is possible to provide a gas turbine system that can be operated such as to enable flexible usage of high pressure hot water generated by solar heat as much as possible. Further, generation of a loss that accompanies thermal radiation can be reduced by storing high pressure hot water in the thermal storage.

In the invention according to claim 10, provided is a control device for the gas turbine system according to claim 9, including: a high-pressure-hot-water generation-rate obtaining unit for measuring a generation rate of high pressure hot water generated by the solar collector; a high-pressure-hot-water storage-amount obtaining unit for obtaining a storage amount of high pressure hot water stored in the thermal storage; a high-pressure-hot-water atomizing-stage-quantity setting unit for setting a quantity of stages of atomizing base pipes, out of plural stages of atomizing base pipes, from which the high pressure hot water is to be atomized; and a supply amount setting unit for setting respective supply amounts of the high pressure hot water and the normal temperature water to be supplied to the atomiser, wherein, based on at least a current generation rate of high pressure hot water obtained by the high-pressure-hot-water generation-rate obtaining unit and a storage amount of high pressure hot water obtained by the high-pressure-hot-water storage-amount obtaining unit, the high-pressure-hot-water atomizing-stage-quantity setting unit computes a quantity of stages of atomizing base pipes capable of atomizing the high pressure hot water for a preset time and determines atomizing base pipes that are to atomize the high pressure hot water, and wherein the supply amount setting unit sets the respective supply amounts of the high pressure hot water and the normal temperature water to be supplied to the atomiser, corresponding to the computed quantity of stages of atomizing base pipes.

According to the invention as set forth in claim 10, based on at least a current generation rate of high pressure hot water obtained by the high-pressure-hot-water generation-rate obtaining unit and a storage amount of high pressure hot water obtained by the high-pressure-hot-water storage-amount obtaining unit, the high-pressure-hot-water atomizing-stage-quantity setting unit computes a quantity of stages of atomizing base pipes capable of atomizing the high pressure hot water for a preset time and determines atomizing base pipes that are to atomize the high pressure hot water. The supply amount setting unit sets the respective supply amounts of the high pressure hot water and the normal temperature water to be supplied to the atomiser, corresponding to the computed quantity of stages of atomizing base pipes. As a result, it is possible to provide a control device, for a gas turbine system, that enables operation of the gas turbine system such as to flexibly use high pressure hot water generated by solar heat and high pressure hot water stored in the thermal storage as much as possible. Further, generation of a loss that accompanies thermal radiation can be reduced by storing high pressure hot water in the thermal storage.

In the invention according to claim 12, provided is a control method executed by the control device, according to claim 10, for the gas turbine system, wherein the control device further includes a weather information obtaining unit for obtaining forecasted weather information, wherein the high-pressure-hot-water atomizing-stage-quantity setting unit estimates and computes a future generation rate of high pressure hot water from the weather information obtained by the weather information obtaining unit and the current generation rate of high pressure hot water obtained by the high-pressure-hot-water generation-rate obtaining unit, computes a quantity of stages of atomizing base pipes capable of atomizing the high pressure hot water for a preset time, based on the estimated and computed high pressure hot water generation rate and the storage amount of high pressure hot water obtained by the high-pressure-hot-water storage-amount obtaining unit, and thereby determines atomizing base pipes to atomize the high pressure hot water, and wherein the supply amount setting unit sets the respective supply amounts of the high pressure hot water and the normal temperature water to be supplied to the atomiser, corresponding to the computed quantity of stages of atomizing base pipes.

According to the invention as set forth in claim 12, the high-pressure-hot-water atomizing-stage-quantity setting unit computes a quantity of stages of atomizing base pipes capable of atomizing the high pressure hot water for a preset time, based on the estimated and computed high pressure hot water generating rate and the storage amount of high pressure hot water obtained by the high-pressure-hot-water storage-amount obtaining unit, and thereby determines atomizing base pipes that are to atomize the high pressure hot water, and the supply amount setting unit sets the respective supply amounts of the high pressure hot water and the normal temperature water to be supplied to the atomiser, corresponding to the computed quantity of stages of atomizing base pipes. As a result, as it is possible to fix for a preset time the quantity of stages of atomizing base pipes for atomizing high pressure hot water, it is possible to prevent occurrence of a case that high pressure hot water is used so quickly that only atomizing base pipes for atomizing normal temperature water can be used from the middle, and it is thereby possible to reduce the possibility of erosion of the compressor caused by atomizing normal temperature water from an atomizing base pipe near the inlet side of the compressor.

Advantage of the Invention

According to the present invention, it is possible to provide a gas turbine system, a control device for a gas turbine system, and a control method for a gas turbine system that can satisfy requirement for increasing output, corresponding to the operational state of a gas turbine system, even in a case that high pressure hot water generated by using solar heat energy cannot be used.

BRIEF DESCRIPTION OF THE DRAWINGS

FIG. 4 illustrates the operations of the respective valves and pumps of a high pressure hot water atomizing system using solar heat and a normal temperature water atomizing system in respective cases of a control mode of using high pressure hot water and a control mode of using normal temperature water;

EMBODIMENTS FOR CARRYING OUT THE INVENTION

First Embodiment

Figure 1:
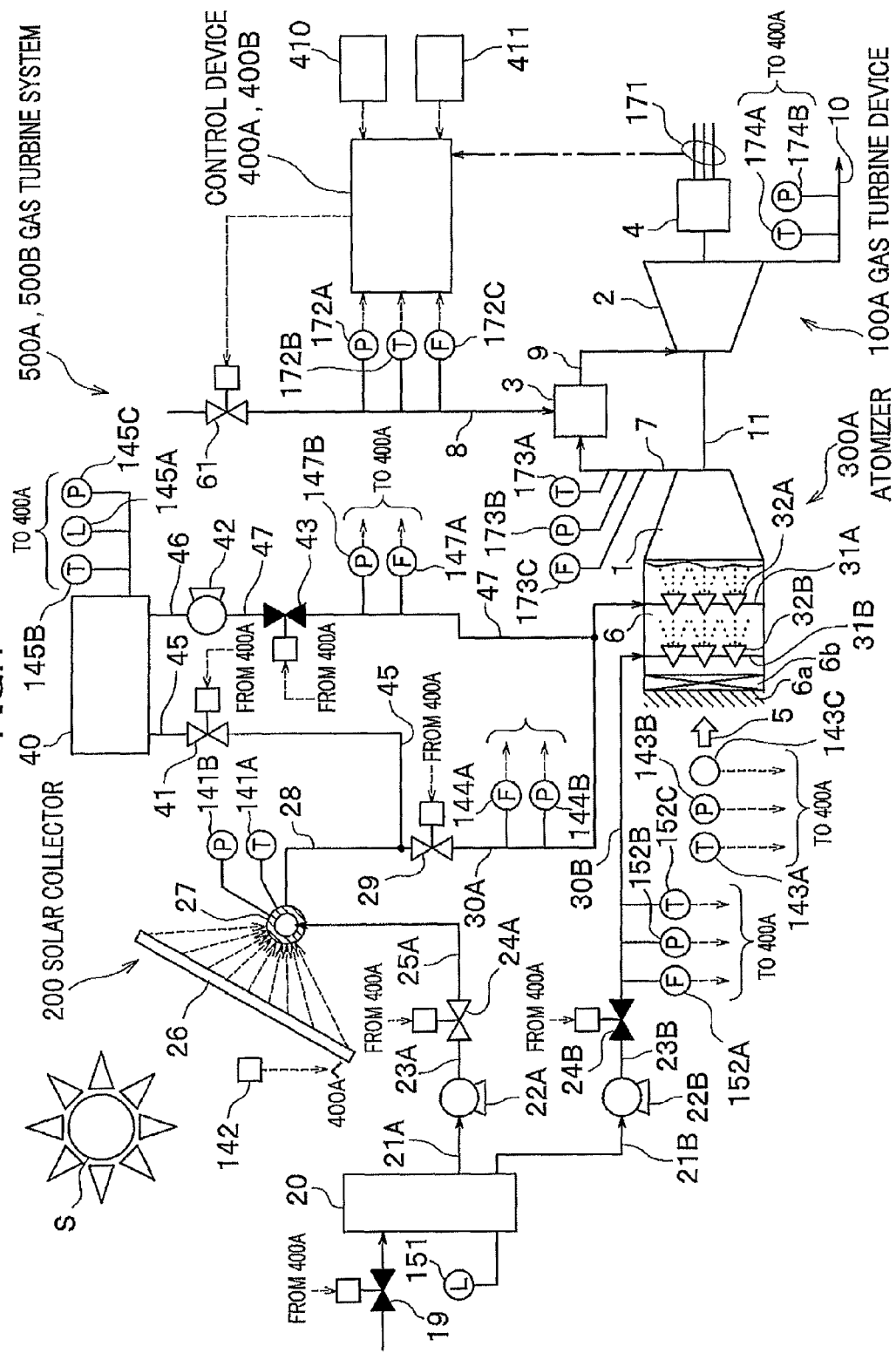
FIG. 1 shows the configuration of a gas turbine system in a first embodiment according to the present invention.

A gas turbine system 500A in a first embodiment of the present invention will be described below, referring to FIGS. 1 to 8. FIG. 1 shows the configuration of a gas turbine system in the first embodiment according to the present invention.

As shown in FIG. 1, the gas turbine system 500A is configured, mainly including a gas turbine device 100A, a solar collector 200 for generating high pressure hot water by collecting solar heat, an atomiser 300A for atomizing the high pressure hot water generated by the solar collector 200 to intake air 5 and atomizing normal temperature water to the intake air 5, as necessary, a thermal storage 40 for storing the high pressure hot water generated by the solar collector 200, maintaining the temperature of the high pressure hot water, a control device 400A, a weather information receiving device (weather information obtaining unit) 410, and a power feeding instruction receiving device 411.

Air Intake Duct and Atomiser

In the gas turbine device 100A, there is provided on the upstream side of a compressor 1, for example, an air intake duct 6 with a rectangular cross-section. There is provided on the inlet side of the air intake duct 6, for example, a louver 6$a$ and further a filter 6$b$ for removing dusts. In the air intake duct 6, further arrangement is made in the following manner. That is, atomizing nozzles 32B for atomizing normal temperature water to the intake air 5 are provided, for example, in a grid form on the downstream side (the compressor 1 side) of the filter 6$b$, and an atomizing base pipe 31B for supplying normal temperature water to the respective atomizing nozzles 32B. Further, atomizing nozzles 32A for atomizing high pressure hot water described later to the intake air 5 are provided, for example, in a grid form, on the downstream side (compressor 1 side) of the atomizing nozzles 32B, and an atomizing base pipe 31A for supplying high pressure hot water to the respective atomizing nozzles 32A is provided. In such a manner, the atomiser 300A is configured.

The air intake duct 6 in FIG. 1 is shown as a partial cross-sectional view to show the atomizing base pipe 31A, the atomizing nozzles 32A, the atomizing base pipe 31B, and the atomizing nozzles 32B.

In case that the air intake duct 6 is provided with the filter 6$b$ or a silencer, not shown, the atomiser 300A is desirably disposed on the downstream side of the filter 6$b$ and the silencer with respect to the flow of the intake air 5.

Compressor 1, Combustor 3, and Gas Turbine 2

Intake air 5 under atmospheric conditions is sucked through the air intake duct 6 into the compressor 1 and pressurized by the compressor 1, and then turns into compressed air 7 to flow into a combustor 3. The compressed air 7 and fuel 8 supplied through a flow rate adjusting valve 61 are mixed and combusted in the combustor 3 and high temperature combustion gas 9 is generated. The combustion gas 9 flows into a gas turbine 2 to rotationally drive the gas turbine 2. Further, a generator 4 connected with the gas turbine 2 through a shaft is rotationally driven by the gas turbine 2 to generate power. The combustion gas 9 having driven the gas turbine 2 is emitted from the gas turbine 2 as a combustion emission gas 10 from the gas turbine 2. Further, the compressor 1 is rotationally driven by a drive shaft 11 of the gas turbine 2.

Solar Collector 200 and High Pressure Hot Water Atomizing System Using Solar Heat The configurations of the solar collector 200 using solar heat energy and the high pressure hot water atomizing system will be described below.

Water in a water tank 20 for storing normal temperature water is supplied through a pipe 21A to a pump 22A, and pressurized by the pump 22A to be pressure-transferred through a pipe 23A, a flow rate adjusting valve 24A, and a pipe 25A in this order to a solar collecting tube 27. Solar light from the sun S collected by a light collecting plate 26 is projected to the solar collecting tube 27. The heat of the solar light collected and projected by the light collecting plate 26 heats the water supplied inside the solar collecting tube 27 so that the water becomes a high pressure hot water. The high pressure hot water inside the solar collecting tube 27 is pressure-transferred through a pipe 28, a flow rate adjusting valve 29, and a pipe 30A in this order to be finally supplied to the above-described atomizing base pipe 31A.

Herein, although the light collecting plate 26 and the solar collecting tube 27 construct the solar collector 200, the solar collector 200 can also have, for example, a configuration (parabolic trough solar collector) wherein a curved mirror is disposed as a light collecting plate 26, along a solar collecting tube 27, to collect solar light to the solar collecting tube 27 at the position of the linear focal point of the curved mirror, a configuration where a plane mirror is arranged substantially in a V-shape as a light collecting plate 26 and a solar collecting tube 27 is disposed at the part of collecting light by the plane mirror arranged in the V-shape, a configuration where a solar collecting tube 27 is disposed at the focal point of a plane Fresnel lens, or a configuration (dish type solar collector) where plural curved mirrors or plane mirrors as a light collecting plate 26 are disposed in a three dimensional parabolic shape and a disc-shaped solar collecting tube 27 is disposed at the focal point of the parabolic shape.

In FIG. 1, a single unit is representatively shown as a solar collector 200, however, an arrangement is ordinarily made such that a plurality of units are installed by connecting solar collecting tubes 27 serially or in parallel wherein high pressure hot waters generated there join at a pipe 28. In case of a dish type solar collector and a tower type solar collector, arrangement with a single unit is possible.

On the way to a flow rate adjusting valve 29, the pipe 28 branches to a pipe 45 directed to a flow rate adjusting valve 41 and is thus connected to the thermal storage 40. In case that high pressure hot water generated by the solar collecting tube 27 is not atomized into the air intake duct 6 or in case that the generation rate of high pressure hot water is higher than the atomization rate of atomization into the air intake duct 6, high pressure hot water is stored into the thermal storage 40 through the flow rate adjusting valve 41.

The thermal storage 40 is connected with a pump 42 that sucks stored high pressure hot water from the thermal storage 40 through a pipe 46. Subsequently, piping is arranged such that the discharging side of the pump 42 is connected to a pipe 47 that is directed to a flow rate adjusting valve 43 so that high pressure hot water stored in the thermal storage 40 joins a pipe 30A.

Herein, the water tank 20, the pipe 21A, the pump 22A, the pipe 23A, the flow rate adjusting valve 24A, the pipe 25A, the solar collecting tube 27, the pipe 28, the flow rate adjusting valve 29, the pipe 30A, the pipe 45, the flow rate adjusting valve 41, the thermal storage 40, the pipe 46, the pump 42, the pipe 47, the flow rate adjusting valve 43, the atomizing base pipe 31A, and the atomizing nozzles 32A construct 'the high pressure hot water atomizing system using solar heat' set forth in claims.

The pipe 21A, the pump 22A, the pipe 23A, the flow rate adjusting valve 24A, the pipe 25A, the solar collecting tube 27, the pipe 28, the flow rate adjusting valve 29, and the pipe 30A construct 'the high pressure hot water supply piping using solar heat' set forth in claims.

Further, the pump 42, the flow rate adjusting valve 43, and the pipes 46, 47 construct 'the thermal storage high pressure hot water supply system' set forth in claims. The pipe 45, the flow rate adjusting valve 41, the thermal storage 40, the pipe 46, the pump 42, the pipe 47, and the flow rate adjusting valve 43 construct 'the stored high pressure hot water supply piping' set forth in claims.

Normal Temperature Water Atomizing System

Water in the water tank 20 is supplied through the pipe 21B to the pump 22B, pressurized by the pump 22B, and transferred through a pipe 23B, a flow rate adjusting valve 24B, and a pipe 30B in this order to be finally supplied to the above-described atomizing base pipe 31B.

Herein, the water tank 20, the pipes 21B, 23B, the pump 22B, the pipe 30B, the flow rate adjusting valve 24B, the atomizing base pipe 31B, and the atomizing nozzles 32B construct the 'normal water atomizing system' set forth in claims.

Incidentally, a water level sensor 151 is provided in the water tank 20, and a water level signal is transmitted from the water level sensor 151 to the control device 400A. Then, normal temperature water is replenished through an opening-closing valve 19, which is an water supply valve operated to open or close by a signal from the control device 400A, so that an appropriate range of the water level is maintained.

Measuring Sensor

The gas turbine system 500A is provided with various measuring sensors to measure the temperature, the pressure, the flow rate of a fluid, and the power generation amount by the generator 4, and transmits measured signals to the control device 400A. Thus, the control device 400A controls driving of the above-described pumps 22A, 22B, and 42 and adjusts the opening degrees of the flow rate adjusting valve 19, 24A, 24B, 29, 43, and 61. FIG. 1 shows representative measuring sensors as examples.

The outlet side, of the solar collector 200, to be connected with the pipe 28 from the solar collecting tube 27, is provide with a temperature sensor 141A for measuring the temperature of the hot water heated by solar heat energy and a pressure sensor 141B for measuring the pressure of the hot water. In the vicinity of the solar collector 200, a light amount sensor 142 for measuring the irradiation amount of the sun S is provided, and the generation rate of high pressure hot water by the solar collector 200 can be computed by a later-described heat collection amount computing section 427 of the control device 400A.

On the upstream side of the meeting point with the pipe 47, the pipe 30A is provided with a flow rate sensor 144A with a built-in temperature sensor and a pressure sensor 144B, wherein the flow rate sensor 144A transmits a mass flow rate signal after density correction by temperature from a measured volume flow rate, and the pressure sensor 144B transmits a measured pressure signal to the control device 400A.

The thermal storage 40 is provided with a water level sensor 145A, a temperature sensor 145B, and a pressure sensor 145C, wherein a water level signal, a temperature signal, and a pressure signal are transmitted to the control device 400A.

On the downstream side of the flow rate adjusting valve 43, the pipe 47 is provided with a flow rate sensor 147A with a built-in temperature sensor and a pressure sensor 144B, wherein the flow rate sensor 147A transmits a mass flow rate signal after density correction by temperature from a measured volume flow rate, and the pressure sensor 147B transmits a measured pressure signal to the control device 400A.

The pipe 30B on the downstream side of the flow rate adjusting valve 24B is provided with a flow rate sensor 152A with a built-in temperature sensor, a pressure sensor 152B, and a temperature sensor 152C, wherein the flow rate sensor 152A transmits a mass flow rate signal after density correction by temperature from a measured volume flow rate, the pressure sensor 152B transmits a measured pressure signal, and the temperature sensor 152C transmits a measured temperature signal respectively to the control device 400A.

The inlet side of the air intake duct 6 is provided with a temperature sensor 143A, a pressure sensor 143B, and a humidity sensor 143C respectively measure the temperature, the pressure, and the humidity of the intake air 5 under the atmospheric conditions, wherein respective measurement signals are transmitted to the control device 400A.

In FIG. 1, the temperature sensor 143A, the pressure sensor 143B, and the humidity sensor 143C are provided on the outer side of the air intake duct 6, however, actually, these are installed at positions, on the downstream side of the louver 6a, which are free from solar light or rain water, and are of course installed on the upstream side of the atomiser 300A.

Among these sensors, the temperature sensor 143A is used particularly for a control in the following case. That is, in a case that the atmospheric temperature is high in summer or the like, if the inlet temperature of the compressor 1 is left under atmospheric conditions, the output that can be taken outside decreases accompanying a drop in the output of the gas turbine 2, corresponding to a decrease in the intake air flow rate of the compressor 1 due to a drop in the air density. Therefore, in order to compensate for the drop in the output of the gas turbine 2 due to an increase in the atmospheric temperature, a high pressure hot water or a normal temperature water is atomized into the air intake duct 6 from the atomiser 300A, and the air temperature at the inlet of the compressor 1 is controlled to thus decrease by the effect of evaporation latent heat. The temperature sensor 143A is used for this control.

The output side of the generator 4 is provided with an output sensor 171 for detecting the power generation amount, and the power generation amount is transmitted to the control device.

Further, the gas turbine device 100A is provided with a pressure sensor 172A, a temperature sensor 172B, and a flow rate sensor 172C which respectively measure the pressure, the temperature, and the volume flow rate of fuel 8 supplied to the combustor 3, wherein a pressure signal, a temperature signal, and a volume flow rate signal are transmitted to the control device 400A. These signals are used for opening degree feedback control of a flow rate adjusting valve 61 in a control logic of controlling, by the flow rate adjusting valve 61, the mass flow rate of fuel supplied to the combustor 3.

Incidentally, the pump and the tank in the fuel supply system are omitted in FIG. 1.

Further, the pipe on the outlet side of the compressor 1 is provided with a temperature sensor 173A, a pressure sensor 173B, and a flow rate sensor 173C, which respectively measure the temperature, the pressure, and the flow rate of compressed air pressurized, for example, by the compressor 1.

The emission side of the gas turbine 2 is provided with a temperature sensor 174 and a pressure sensor 174B for respectively measuring, for example, the temperature of a combustion emission gas or the back-pressure of the gas turbine 2, wherein a temperature signal and a pressure signal are transmitted to the control device 400A. These signals are used for, for example, operation monitoring, efficiency monitoring, or the like of the gas turbine device 100A. Actually, the gas turbine device 100A is further provided with a measuring sensor for operation monitoring of the gas turbine device 100A, however, description will be omitted because the present invention is not related thereto.

Figure 2:
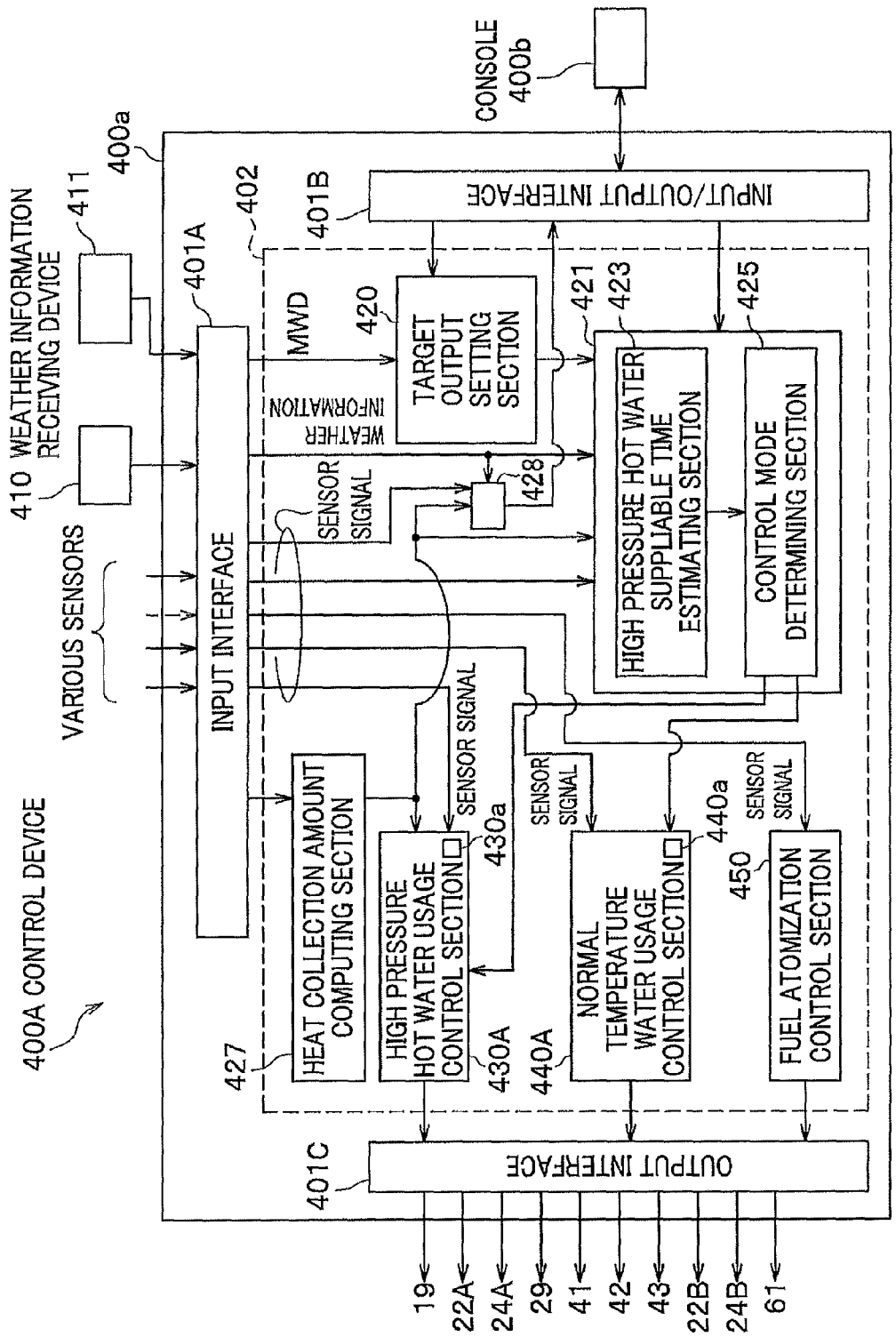
FIG. 2 shows the function block configuration of a control device for the gas turbine system in the first embodiment.

Although omitted in FIG. 1, sensors for detecting the rotational speed or ON/OFF state of the pumps 22A, 22B, and 42 are provided, and valve opening degree sensors for detecting the valve opening degrees of the flow rate adjusting valves 24A, 24B, 29, 41, 43, and 61 are also provided, wherein respective signals are input to the control device 400A.
Control Device The function configuration of the control device 400A will be described below, referring to FIG. 2. FIG. 2 shows the function block configuration of a control device for the gas turbine system in the first embodiment.

The control device 400A is configured with a control device main body 400a and a console 400b. The control device 400A is, for example, a process computer, and the console 400b is configured with a display device and an input device. The display device is, for example, a liquid crystal display device, and the input device is, for example, configured with a mouse and a keyboard.

The control device main body 400a includes, for example, an input interface 401A, an input/output interface 401B, an output interface 401C, a CPU 402, a ROM, a RAM, a hard disk storage device and the like, which are not shown. Programs and data, not shown, stored in the hard disk storage device are read out and executed by the CPU 402, to thereby realize later-described respective functional configurations.

To the input interface 401A, measurement signals (Symbols of sensors are omitted in FIG. 2.) are input from the above-described various sensors 141A, 141B, 142, 143A, 143B, 143C, 144A, 144B, 145A, 145B, 145C, 147A, 147B, 151, 152A, 152B, 171, 172A, 172B, 172C, 173A, 173B, 173C, 174A, and 174B.

Further, weather information (hereinafter, also referred to as 'whether forecast information') from the weather information receiving device 410, particularly information on variation in the predicted atmospheric temperature and information on variation in the predicted sun light amount are input to the input interface 401A.

Further, a mega watt demand MWD received by the power feeding instruction receiving device 411 is input to the input interface 401A.

Incidentally, the weather information receiving device 410 and the power feeding instruction receiving device 411 communicate with the origin of information, for example, by radio communication or internet connection.

An instruction from the above-described input device of the console 400b is input to the input/output interface 401B, and the input/output interface 401B outputs a display output to the above-described display device of the console 400b.

The output interface 401C outputs opening/closing control signals to the opening-closing valve 19, which is an on/off valve, outputs an opening degree control signals to the flow rate adjusting valve 24A, 29, 41, 43, 24B, and 61, and outputs a start, stop, and rotational speed control signals to the pump 22A, 22B, and 42.

As functional configurations realized by the CPU 402, as shown in FIG. 2, mainly included are a demand output setting section 420, a control mode switching section (atomization control mode determining unit) 421, a heat collection amount computing section (high-pressure-hot-water generation-rate obtaining unit) 427, a plant monitoring section 428, a high pressure hot water usage control section 430A, a normal temperature water usage control section 440A, and a fuel atomization control section 450.

A mega watt demand MWD received by the power feeding instruction receiving device 411 is input to the demand output setting section 420, and the demand output setting section 420 continuously updates and sets the mega watt demand MWD. A mega watt demand MWD having been updated and set is input to the control mode switching section 421.

The demand output setting section 420 also has a function to change the setting of the mega watt demand MWD, upon an input instruction from the console 400b. When the demand output setting section 420 has received an instruction to increase the mega watt demand MWD from the console 400b, the demand output setting section 420 outputs a notification of having received the requesting instruction and the new mega watt demand MWD to the control mode switching section 421.

Based on a sensor signal from the light amount sensor 142, the heat collection amount computing section 427 computes the generation rate of high pressure hot water by the solar collector 200, and inputs the generation rate to the control mode switching section 421, the plant monitoring section 428, and the high pressure hot water usage control section 430A.

For high pressure hot water to be generated by solar energy by the solar collector 200, it is assumed that the rotational speed of the pump 22A and the opening degree of the flow rate adjusting valve 24A are controlled such that the high pressure hot water is generated, for example, in a range 150-200° C., and it is intended that the high pressure hot water with a temperature of 150-200° C. is supplied to the atomizing base pipe 31A of the atomiser 300A. For simplifying the control, herein, conversion into a generation rate of high pressure hot water of 150° C. is defined as high pressure hot water generation rate $G_{WH}$.

The control mode switching section 421 includes a high-pressure-hot-water suppliable-time estimating section 423 and a control mode determining section 435. Certain signals among sensor signals, which are input to the input interface 401A, are input to the control mode switching section 421. Signals that are concretely used will be described in the description of the later-described flowchart in FIGS. 5 and 6, and description of these signals is omitted here.

Based on a high pressure hot water generation rate $G_{WH}$ from the heat collection amount computing section 427, weather forecast information from the weather information receiving device 410, and a water level $S0$ of the thermal storage 40, the high-pressure-hot-water suppliable-time estimating section 423 estimates a suppliable time of high pressure hot water. The high-pressure-hot-water suppliable-time estimating section 423 estimates and computes a required atomization rate $Q_{WHe}(t)$ of high pressure hot water with respect to variation in the weather forecast information, particularly variation in atmospheric temperature $T_{Aire}(t)$, estimates and computes a high pressure hot water generation rate $G_{WHe}(t)$ with respect to variation in the weather forecast information, particularly variation in the sun light amount, and checks whether or not the time length, during which the relationship represented by the following Expression (1) is maintained, exceeds a preset time length TSH, or checks whether or not the following Expression (2) is satisfied. Then, a result is output to a control mode determining section 425.

$$G_{WHe}(t) \geq Q_{WHe}(t) \quad (1)$$

$$S_0 + \int_0^{TSH}(G_{WHe}(t) - Q_{WHe}(t)) \geq 0 \quad (2)$$

$$S_0 + \int_0^{TSH}(G_{WHe}(t) - Q_{WHe}(t))dt \geq 0 \quad (2)$$

If either Expression (1) is satisfied, exceeding the time length TSH, or if Expression (2) is satisfied or the control mode determining section 425 determines to atomize high pressure hot water by the atomiser 300A (control node A (see FIG. 4)), and if not either, the control mode determining section 425 determines to atomize normal temperature water by the atomiser 300A (control mode B (see FIG. 4)). In such a manner, the control mode determining section 425 has the high pressure hot water usage control section 430A and normal temperature water usage control section 440A execute control of the control mode A or the control mode B.

Details of the control mode A and the control mode B will be described later in the description of FIG. 4.

In the mode (control mode A) of atomizing high pressure hot water by the atomiser 300A, the high pressure hot water usage control section 430A controls operation of the pumps 22A, 42, according to later-described sub-modes A1, A2, and A3 as shown in FIG. 4, and performs control of the opening degrees of the flow rate adjusting valves 24A, 29, 41, and 43. Thus, the high pressure hot water usage control section 430A performs control of the atomization rate $Q_{WH}$ of high pressure hot water, corresponding mainly to a signal of atmospheric temperature $T_{Air}$ from the temperature sensor 143A (see FIG. 1) and a mega watt demand MWD, using a data map 430a.

Further, in a mode (control mode B) of atomizing normal temperature water by the atomiser 300A, a high pressure hot water control section 430 controls the operation of the pump 22A and controls the opening degrees of the flow rate adjusting valves 24A and 41 in a later described sub-mode B1 as shown in FIG. 4.

A signal as to whether or not to atomize high pressure hot water from the control mode determining section 425 and a signal of the high pressure hot water generation rate from the heat collection amount computing section 427 are input to the high pressure hot water usage control section 430A. Further, though not shown in FIG. 2, a mega watt demand MWD is input from the demand output setting section 420, and sensor values from sensors 141A, 141B, 142, 143A, 143B, 143C, 144A, 144B, 145A, 145B, 145C, 147A, and 147B are input through the input interface 401A.

Figure 3A:
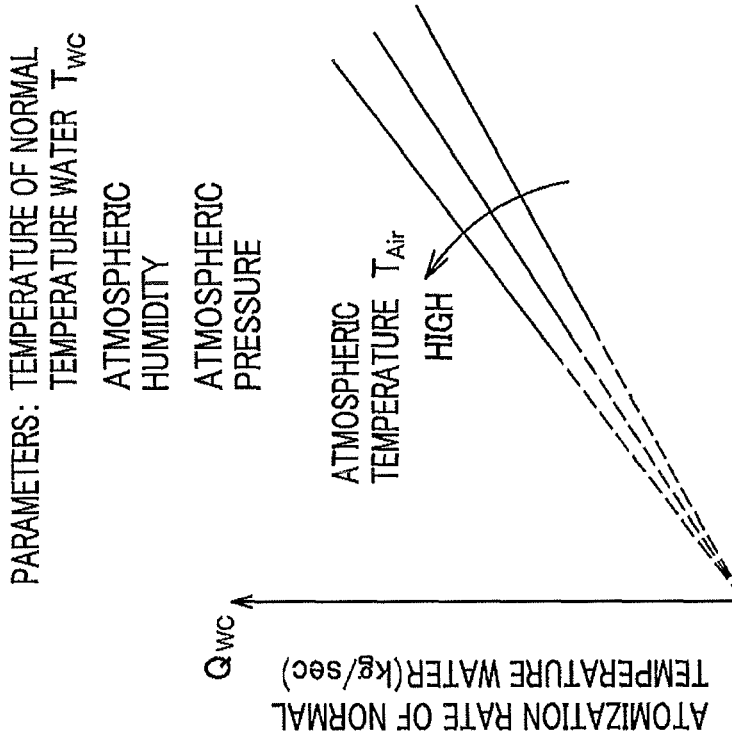
FIG. 3($a$) illustrates a data map for setting the atomization rate of high pressure hot water with respect to the mega watt demand MWD in using high pressure hot water, and ($b$) illustrates a data map for setting the atomization rate of normal temperature water with respect to the mega watt demand MWD in using normal temperature water.

FIG. 3A illustrates a data map for setting the atomization rate of high pressure hot water with respect to mega watt demand MWD in using high pressure hot water. The horizontal axis represents mega watt demand MWD (unit: MW) and the vertical axis represents atomization rate $Q_{WH}$ (unit: kg/sec) of high pressure hot water.

This data map 430a uses, for example, the atmospheric humidity, the atmospheric pressure, and the high pressure hot water temperature $T_{WH}$ in addition to the atmospheric temperature $T_{Air}$ as parameters. For these parameters, as the atmospheric humidity, a measurement signal from the humidity sensor 143C (see FIG. 1) is used, and as the high pressure hot water temperature $T_{WH}$, a measured temperature by the temperature sensor 141A (see FIG. 1) is used when high pressure hot water from the solar collector 200 is supplied to the atomiser 300A (see FIG. 1), and the temperature sensor 145B (see FIG. 1) is used when high pressure hot water from the thermal storage 40 (see FIG. 1) is supplied to the atomiser 300A.

As recognized from the data map 430a, the higher the atmospheric temperature $T_{Air}$ is, the higher the atomization rate $Q_{WH}$ of high pressure hot water is.

In the mode (control mode B) of atomizing normal temperature water by the atomiser 300A, normal temperature water usage control section 440A controls the operation of the pump 22B and controls the opening degree of the flow rate adjusting valve 24B, according to the later-described sub-mode B1 shown in FIG. 4, as necessary, and controls the atomization rate $Q_{WC}$ of normal temperature water, corresponding mainly to a signal of the atmospheric temperature $T_{Air}$ from the temperature sensor 143A and mega watt demand MWD, using the data map 440a.

Though not shown in FIG. 2, to normal temperature water usage control section 440A, sensor values are input via the input interface 401A from the sensors 143A, 143B, 143C, 152A, 152B, and 152C in addition to mega watt demand MWD from the demand output setting section 420.

Figure 3B:
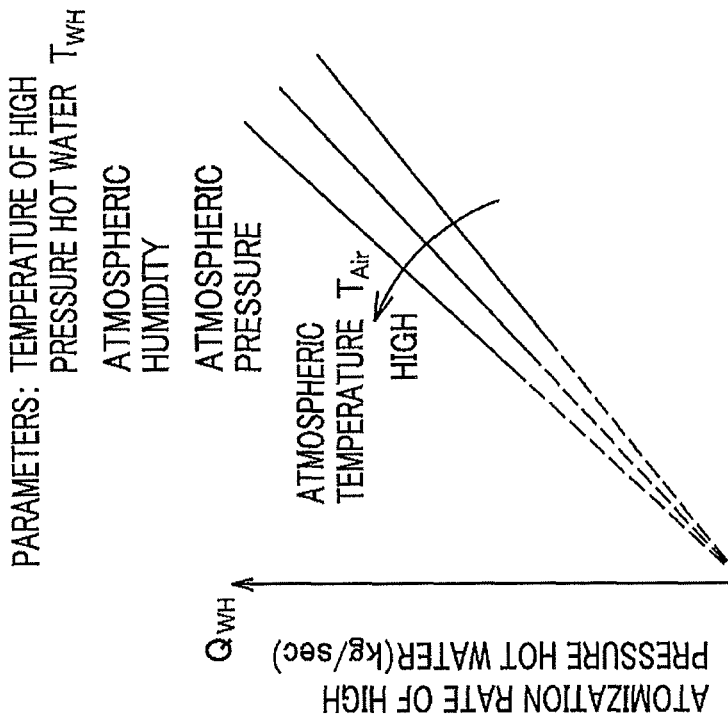

FIG. 3(b) illustrates a data map for setting the atomization rate of normal temperature water with respect to mega watt demand MWD in using normal temperature water. The horizontal axis represents mega watt demand MWD (unit: MW) and the vertical axis represents the atomization rate $Q_{WC}$ (unit: kg/sec) of normal temperature water.

This data map 440a uses, for example, the atmospheric humidity, the atmospheric pressure, and the normal temperature water temperature $T_{WC}$ as parameters, in addition to the atmospheric temperature $T_{Air}$. A measurement signal from the humidity sensor 143C is used as the atmospheric humidity among these parameters, and the temperature sensor 152C (see FIG. 1) is used for the normal temperature water temperature $T_{WC}$.

As recognized from the data map 440a, the higher the atmospheric temperature $T_{Air}$ is, the higher the atomization rate $Q_{WC}$ of the normal temperature water is.

The fuel atomization control section 450 sets a demanded fuel atomizing rate and performs feedback control of a fuel atomization rate Gf, based on sensor signals from the above-described temperature sensor 173A, the pressure sensor 173B, and the flow rate sensor 173C, the mega watt demand MWD, and the power generation output from the output sensor 171.

Incidentally, the control of the demanded fuel atomizing rate by the fuel atomization control section 450 is not limited to this control method, and a method of controlling the demanded fuel atomizing rate based on the mega watt demand MWD and sensor signals from other measurement sensors may be applied.

Incidentally, the plant monitoring section 428 reads out necessary data from various sensors, generates a monitoring screen indicating the operational state of the gas turbine system 500A, and displays the screen on the display device of the console 400b.

Control Mode

In the following, referring to FIG. 4, sub-modes A1, A2, A3 in the control mode A (the high pressure hot water atomizing mode) being determined by the control mode determining section 425 (see FIG. 2) and using high pressure hot water, and sub-modes B1, B2 in the control mode B (the normal temperature water atomizing mode) being determined by the control mode determining section 425 and using the normal temperature water and will be described. FIG. 4 illustrates the operations of the respective flow rate adjusting valves and pumps of the high pressure hot water atomizing system using solar heat and the normal temperature water atomizing system in respective cases of the control modes of using high pressure hot water and the control modes of using normal temperature water.

In FIG. 4, the column on the left-end side represents the flow rate adjusting valves 24A, 29, 41, 43 (see FIG. 1) of the high pressure hot water atomizing system using solar heat, the flow rate adjusting valve 24B (see FIG. 1) of the normal temperature water adjusting system, the pumps 22A and 42 (see FIG. 1) of the high pressure hot water atomizing system using solar heat, and the pump 22B (see FIG. 1) of the normal temperature water adjusting system. The next right column representing the control mode A of atomizing the above-described high pressure hot water by the atomiser 300A (see FIG. 1) includes the columns of the sub-mode A1 of supplying the high pressure hot water to the atomiser 300A (see FIG. 1) directly from the solar collector 200 (see FIG. 1) without storing in the thermal storage 40 (see FIG. 1), the sub-mode A2 of supplying most of the high pressure hot water to the atomiser 300A while partially storing in the thermal storage 40, and the sub-mode A3 of supplying high pressure hot water to the atomiser 300A from both the solar collector 200 and the thermal storage 40, wherein open/close operational state of the above-described flow rate adjusting valves 24A, 24B, 29, 41, and 43 and operating/stopping state of the pumps 22A, 22B, and 42 in the respective modes A1-A3 are shown.

The further right side column representing the control mode B of atomizing normal temperature water without atomizing the above-described high pressure hot water to the atomiser 300A includes the columns of the sub-mode B1 of storing high pressure hot water in the thermal storage 40 and the sub-mode B2 that does not store high pressure hot water in the thermal storage 40, wherein open/close operational state of the flow rate adjusting valves 24A, 24B, 29, 41, and 43 and operating/stopping state of the pumps 22A, 22B, 42 in the respective sub-modes B1 and B2 are shown.

Herein, description 'open' of the respective flow rate adjusting valves 24A, 24B, 29, 41, and 43 does not refer to a fully open state but refers to a state in which control of the opening degree is performed, in an open state, by the high pressure hot water usage control section 430A (see FIG. 2) or by normal temperature water usage control section 440A (see FIG. 2) of the control device 400A (see FIG. 1).

The sub-mode A1 refers to a sub-mode in which an atomization rate, which is a required demand value computed by the high pressure hot water usage control section 430A (see FIG. 2), of the control device 400A, for supplying high pressure hot water to the atomiser 300A and a generation rate of high pressure hot water with a temperature of 150-200° C. generated by the solar collector 200 balance with each other, and high pressure hot water generated by the solar collector 200 is supplied directly to the atomizing base pipe 31A (see FIG. 1) of the atomiser 300A. This control is performed by the high pressure hot water usage control section 430A.

In this sub-mode A1, the rotational speed control of the pump 22A, the opening degree of the flow rate adjusting valve 24A, and the opening degree of the flow rate adjusting valve 29 are controlled such that a flow rate signal from the flow rate sensor 144A and pressure signals from pressure sensors 141B and 144B indicate the atomization rate of high pressure hot water corresponding to the current mega watt demand MWD and a certain pressure corresponding to the atomization rate.

Further, in this sub-mode A1, the pumps 22B and 42 are stopped, and the flow rate adjusting valves 24B, 41, and 43 are fully closed.

The sub-mode A2 refers to a sub-mode in which generation of high pressure hot water with a temperature 150-200° C. generated by the solar collector 200 has a margin with respect to an atomization rate that is a required demand value computed by the high pressure hot water usage control section 430A of the control device 400A to supply high pressure hot water to the atomiser 300A, and accordingly, not only high pressure hot water generated by the solar collector 200 is supplied to the atomizing base pipe 31A of the atomiser 300A with the required atomization rate, but also the opening degree of the flow rate adjusting valve 41 is adjusted for marginal high pressure hot water generated by the solar collector 200 such that the required atomization rate indicated by the flow rate sensor 144A (see FIG. 1) and the pressure sensor 144B (see FIG. 1) is maintained. This control is performed by the high pressure hot water usage control section 430A.

In this sub-mode A2, the rotation speed control of the pump 22A and the opening degree of the flow rate adjusting valve 24A are controlled such that high pressure hot water with a certain temperature (150-200° C.) is generated even when the flow rate in the pipe 28 (see FIG. 1) becomes higher than the atomization rate of high pressure hot water corresponding to the current mega watt demand MWD, and the opening degrees of the flow rate adjusting valves 29, 41 are controlled such that a flow rate signal from the flow rate sensor 144A and pressure signals from the pressure sensors 141B, 144B respectively indicate the atomization rate of high pressure hot water corresponding to the current mega watt demand MWD and a certain pressure corresponding to the atomization rate.

Further, in this sub-mode A2, the pumps 22B, 42 are stopped, and the flow rate adjusting valves 24B, 43 are fully closed.

Incidentally, the flow rate adjusting valves 24A, 24B, 29, 41, and 43 in FIG. 1 shows an operational state in the sub-mode A2.

The sub-mode A3 refers to a sub-mode in which the generation rate of high pressure hot water with a temperature 150-200° C. generated by the solar collector 200 is insufficient for the atomization rate which is a required demand value computed by the high pressure hot water usage control section 430A of the control device 400A to supply high pressure hot water to the atomiser 300A, and accordingly, not only all of high pressure hot water generated by the solar collector 200 is supplied to the atomizing base pipe 31A, but also the rotation speed of the flow rate adjusting valve 43 and the opening degree of the flow rate adjusting valve 43 are controlled to increase the atomization rate to cover the shortfall by high pressure hot water stored in the thermal storage 40, based on measurement signals from the flow rate sensor 147A (see FIG. 1) and the pressure sensor 147B (see FIG. 1). This control is performed by the high pressure hot water usage control section 430A.

Incidentally, a hysteresis is set on the atomization rate of high pressure hot water to be supplied to the atomizing base pipe 31A of the atomiser 300A between the sub-mode A1 and the sub-mode A3 so that switching control is not performed frequently between the sub-modes A1 and A3. For this purpose, in the sub-mode A3, 'open' is indicated on the flow rate adjusting valve 43, as necessary, and 'operating' is indicated on the pump 42, as necessary.

In this sub mode A3, the rotational speed control of the pump 22A and the opening degrees of the flow rate adjusting valves 24A, 29 are lower than the atomization rate corresponding to the current mega watt demand MWD, however, are controlled so that high pressure hot water with a certain temperature (150-200° C.) is generated at a certain pressure corresponding to the atomization rate of high pressure hot water that is corresponding to the mega watt demand MWD, wherein the opening degree of the flow rate adjusting valve 29 is controlled such that pressure signals from the pressure sensors 141B and 144B indicate the certain pressure at the atomization rate of high pressure hot water that is corresponding to the current mega watt demand MWD.

Further, the rotational speed control of the pump 42 and the opening degree of the flow rate adjusting valve 43 are controlled such that a signal indicating the flow rate in the pipe 47 (see FIG. 1) from the flow rate sensor 147A becomes the shortage of flow rate in the pipe 28 with respect to the atomization rate of high pressure hot water that is corresponding to the mega watt demand MWD and that the pressure indicated by the pressure sensor 147B agrees with the pressure indicated by the pressure sensor 144B, in other words, a certain pressure corresponding to the atomization rate of high pressure hot water that is corresponding to the mega watt demand MWD.

Further, in the sub-mode A3, the pump 22B is stopped and the flow rate adjusting valve 24B is fully closed.

Incidentally, in this sub-mode A3, a control method is applied in which high pressure hot water generated by the solar collector 200 is all supplied to the pipe 30A (see FIG. 1) and high pressure hot water in the thermal storage 40 is added from the pipe 47 (see FIG. 1) into the pipe 30A, however, an applicable control method is not limited thereto. As it is possible that the temperature of high pressure hot water stored in the thermal storage 40 drops due to heat release, an arrangement may be made such that while all of a high pressure hot water generated by the solar collector 200 is once stored in the thermal storage 40 through the pipe 45 (see FIG. 1), further, the pump 42 and the opening degree of the flow rate adjusting valve 43 are controlled so that an atomization rate which is a required demand value computed by the high pressure hot water usage control section 430A of the control device 400A to supply high pressure hot water to the atomiser 300A is supplied to the atomizing base pipe 31A of the atomiser 300A through the pipes 47, 30A. In this case, the flow rate adjusting valve 29 is not in 'open' state described in FIG. 4 but in 'closed' state.

The sub-mode B1 is a sub-mode in which an atomization rate, which is a required demand value computed by normal temperature water usage control section 440A of the control device 400A to supply normal temperature water to the atomiser 300A, is supplied to the atomizing base pipe 31B (see FIG. 1) of the atomiser 300A, and also all of high pressure hot water with a temperature 150-200° C. generated by the solar collector 200 is stored in the thermal storage 40. That is, this is a case that the generation rate of high pressure hot water obtained by the solar collector 200 is lower than an atomization rate that is a required demand value and high pressure hot water has not been stored sufficiently in the thermal storage 40.

In this control, control of the pump 22B (see FIG. 1) and the opening degree of the flow rate adjusting valve 24B related to the atomization control of normal temperature water is performed by normal temperature water usage control section 440A, while control of storing high pressure hot water in the thermal storage 40 is performed by the high pressure hot water usage control section 430A.

In this sub-mode B1, the rotational speed control of the pump 22B and the opening degree of the flow rate adjusting valve 24B are controlled such that the flow rate signal from the flow rate sensor 152A and the pressure signal from the pressure sensor 152B respectively indicate an atomization rate of normal temperature water corresponding to the current mega watt demand MWD and a certain pressure at this atomization rate. In the sub-mode B2, the rotational speed control of the pump 22A and the opening degrees of the flow rate adjusting valve 24A, 41 are controlled so that high pressure hot water with a certain temperature (150-200° C.) is generated.

Further, in this sub-mode B2, the pump 42 is stopped and the flow rate adjusting valves 29, 43 are fully closed.

The sub-mode B2 is a sub-mode for supplying only an atomization rate, which is a required demand value computed by normal temperature water usage control section 440A of the control device 400A to supply normal temperature water to the atomiser 300A, to the atomizing base pipe 31B (see FIG. 1) of the atomiser 300A. The sub-mode B2 is applied to a case that high pressure hot water cannot be generated by the solar collector 200 (a case that high pressure hot water cannot be generated by insufficient solar heat energy due to cloudy weather or the like, or a case that the solar collector 200 cannot be operated due to inspection or the like). In this control, the control of the pump 22B (see FIG. 1) and the opening degree of the flow rate adjusting valve 24B related to the atomizing control of normal temperature water is performed by normal temperature water usage control section 440A similarly to the case of the sub-mode B1.

In this sub-mode B2, the pumps 22A and 42 are stopped, and the flow rate adjusting valves 24A, 29, 41, and 43 are fully closed.

Figure 5:
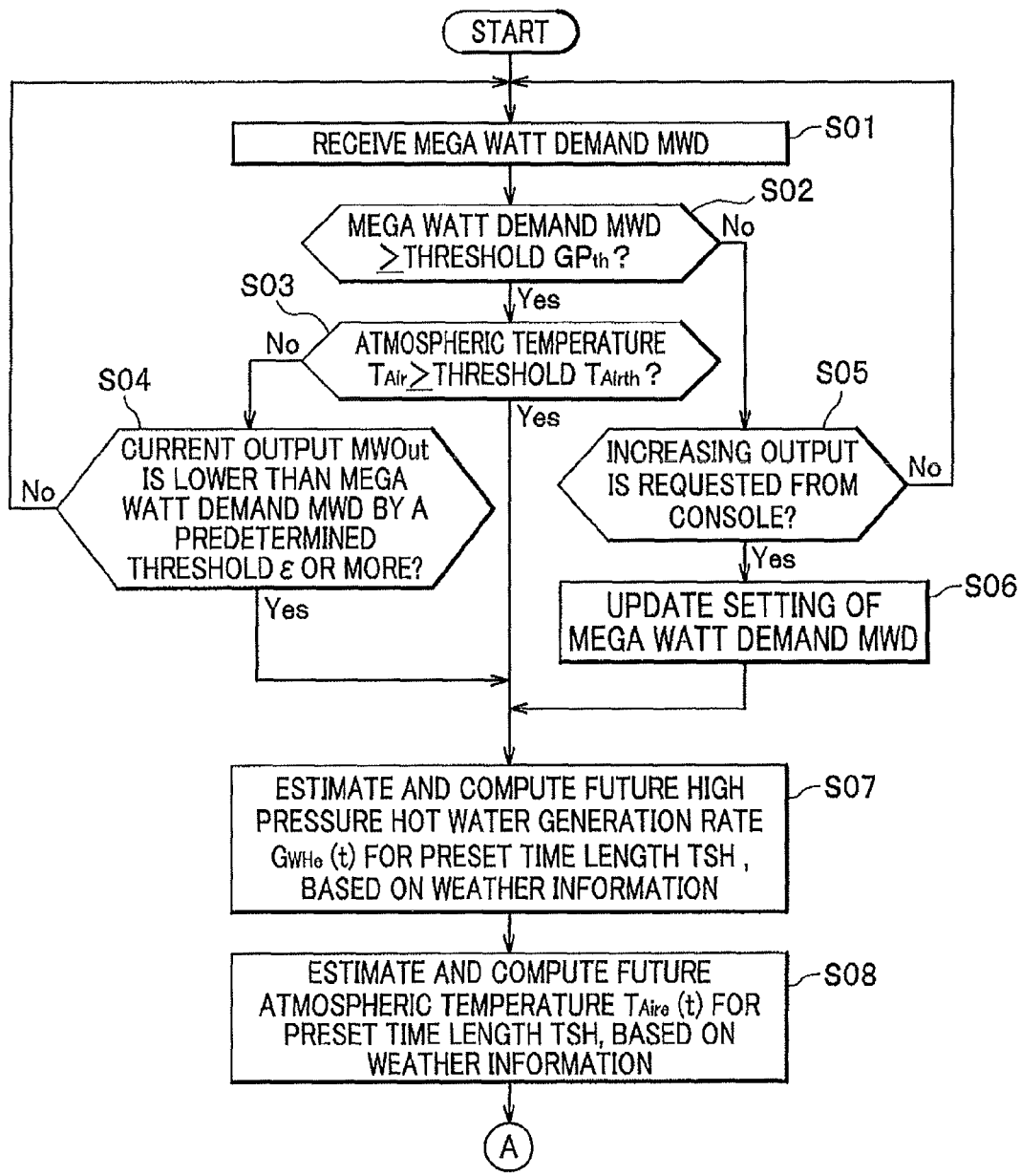
FIG. 5 is a flowchart showing the flow of control to determine to select the control mode of using high pressure hot water or the control mode of using normal temperature water, or to determine to not select these controls in the first embodiment.
Figure 6:
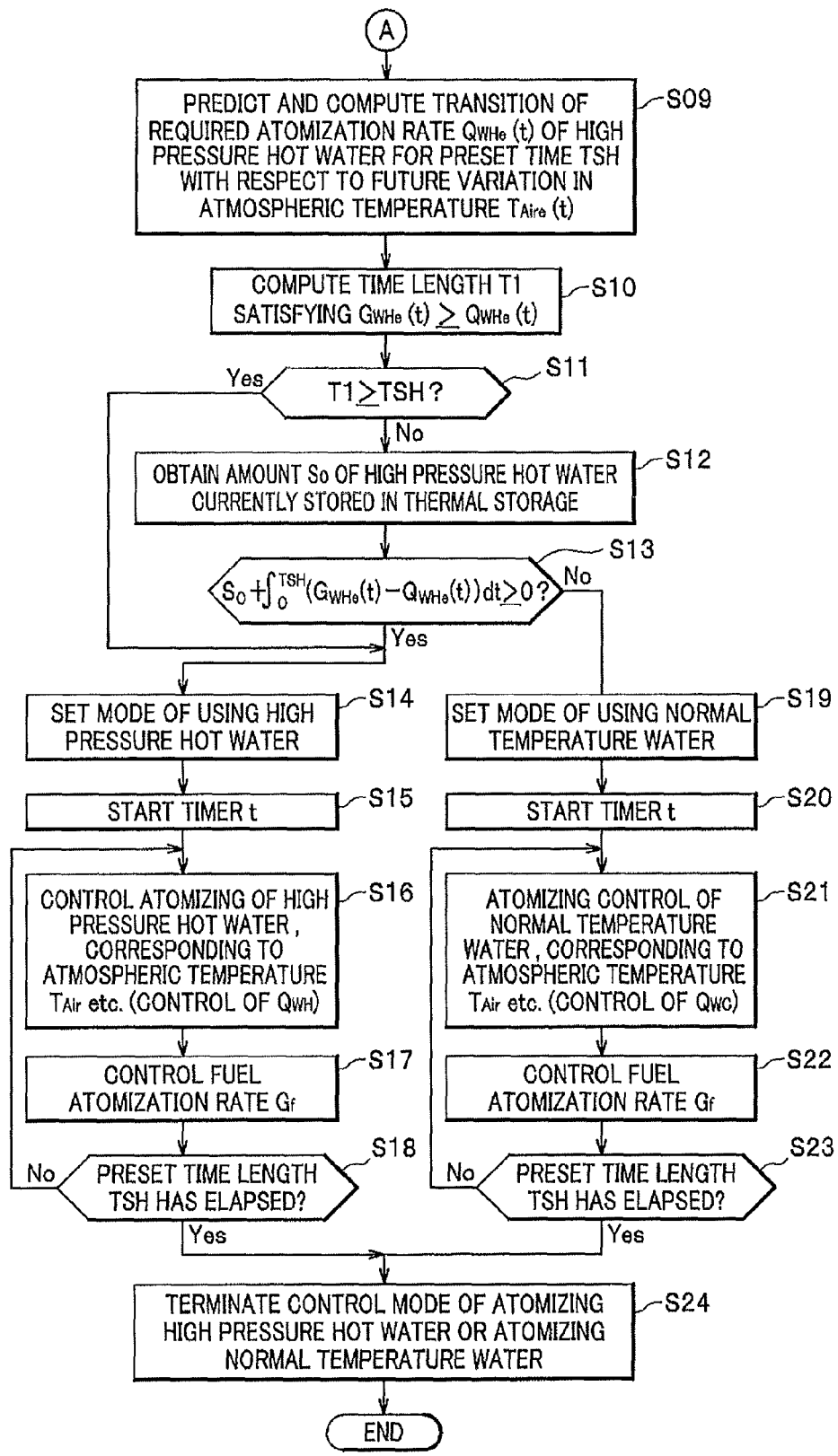
FIG. 6 is the flowchart continued from FIG. 5.

In the following, referring to FIGS. 5 and 6, and referring to FIGS. 1 and 2, as appropriate, a method of switching between control of atomizing high pressure hot water from the atomiser 300A and control of atomizing normal temperature water from the atomiser 300A will be described. FIGS. 5 and 6 show a flowchart that shows a flow of control for selecting the control mode of using high pressure hot water or the control mode of using normal temperature water, or not selecting these modes. The process in steps S01 to S13 in this flowchart is performed by the high-pressure-hot-water suppliable-time estimating section 423, the controls in S14 and S19 are performed by the control mode determining section 425, the controls in steps S15 to S18, and S24 are performed by the high pressure hot water usage control section 430A, and the control in steps S20 to S24 is performed by normal temperature water usage control section 440A.

In step S01, the high-pressure-hot-water suppliable-time estimating section 423 receives a mega watt demand MWD from the demanded output setting section 420. In step S02, the high-pressure-hot-water suppliable-time estimating section 423 checks whether or not the mega watt demand MWD is larger than or equal to a threshold GPth ('mega watt demand≥threshold GPth?'). In case that the gas turbine device 100A (see FIG. 1) makes partial output and the mega watt demand is smaller than the threshold GPth, atomizing high pressure hot water and atomizing normal temperature water are unnecessary for an increase in the output, and the above-described checking is a determination for this case.

If the mega watt demand MWD is larger than or equal to the threshold GPth (Yes), the process proceeds to step S03, and if not (No), the process proceeds to step S05.

In step S03, it is checked whether or not the atmospheric temperature $T_{Air}$ indicated by the temperature sensor 143A (see FIG. 1) is higher than or equal to a threshold $T_{Airth}$ ('atmospheric temperature $T_{Air} \geq$ threshold $T_{Airth}$?'). If the atmospheric temperature $T_{Air}$ is higher than or equal to the threshold $T_{Airth}$ (Yes), the process proceeds to step S07, and if not (No), the process proceeds to step S04.

In step S304, it is checked whether or not the current output MWOut from the output sensor 171 (see FIG. 1) is lower than the mega watt demand MWD by a predetermined threshold s or more. If Yes in step S04, the process proceeds to step S07, and if No, the process returns to step S01. In step S05, it is checked by a signal from the demanded output setting section 420, whether or not an output increasing request has been made from the console 400b (see FIG. 2). If an output increasing request has been made (Yes), the process proceeds to step S06, and if an output increasing request has not been made (No), the process returns to step S01. In step S06, the mega watt demand MWD is updated by setting, and the process proceeds to step S07.

In step S07, a future high pressure hot water generation rate GWHe (t) is estimated and computed to cover a preset time length TSH, based on weather information (weather forecast information) from the weather information receiving device 410 (see FIG. 2). Concretely, regarding the high pressure hot water generation rate $G_{WH}$ having been input from the heat collection amount computing section 427, the current value of forecasted value of sunlight amount in the weather forecast information and a sunlight amount from the light amount sensor 142 are compared; a correction coefficient on the transition in change in the forecasted value of sunlight amount is computed; the transition of the forecasted value (weather information) of sunlight amount is multiplied by the current high pressure hot water generation rate $G_{WH}$ and the above-described correction coefficient; and a future high pressure hot water generation rate $G_{WHe}$ (t) can thus be estimated and computed.

Incidentally, for simplification of control, the high pressure hot water generation rate $G_{WHe}$ (t) is herein computed, for example, with conversion to 150° C.

In step S08, future atmospheric temperature $T_{Aire}$ (t) is estimated and computed to cover the preset time length TSH, based on the weather information (weather forecast information) from the weather information receiving device 410. Concretely, the atmospheric temperature $T_{Air}$ being input from the temperature sensor 143A, which is currently measuring the atmospheric temperature, and the current value of forecasted value of atmospheric temperature are compared; a correction coefficient on the transition of forecasted value of atmospheric temperature is computed; the transition of the forecasted value (weather information) of atmospheric temperature is multiplied by the above-described correction coefficient; and a future atmospheric temperature $T_{Aire}$ (t) can be thus estimated and computed.

Subsequent to step S08, the process proceeds to step S09 in FIG. 6, according to a connector (A).

In step S09, transition of required atomization rate $Q_{WHe}$ (t) of high pressure hot water with respect to the future variation in the atmospheric temperature $T_{Aire}$ (t) having been estimated and computed in step S08 is predicted and computed to cover the preset time length TSH.

Incidentally, herein, for simplification of control, the atomization rate $Q_{WHe}$ (t) of high pressure hot water is computed, for example, with conversion to 150° C.

In step S10, the high pressure hot water generation rate $G_{WHe}$ (t) estimated in step S07 and the atomization rate $Q_{WHe}$ (t) of high pressure hot water predicted and computed in step S09 are compared, and a time length T1 satisfying $G_{WHe}$ (t)≥$Q_{WHe}$ (t) is computed. In step S11, it is checked whether or not T1 is longer than or equal to the preset time length TSH. If T1 is longer than or equal to the preset time length TSH (Yes), the process proceeds to step S14, and if not (No), the process proceeds to step S12.

In step S12, an amount S0 of high pressure hot water currently stored in the thermal storage 40 (see FIG. 1) is obtained, for example, in conversion to 150° C., from a water level signal, a temperature signal, and a pressure signal which are output from the water level sensor 145A, the temperature sensor 145B, and the pressure sensor 145C provided in the thermal storage 40. In step S13, it is checked whether or not the above-described Expression (1) is satisfied. If Yes in step S13, the step proceeds to step S14, and if No, the process proceeds to step S19.

In step S14, the control mode determining section 425 sets a mode using high pressure hot water. Then, the setting signal is input to the high pressure hot water usage control section 430A and normal temperature water usage control section 440A.

Herein, the above-described preset time length TSH is a time length having been set in advance by an operator's input via the console 400b (see FIG. 2), and for example, in a case of summer time, the length of a time period in which power consumption by air conditioners increases and power demand increases, wherein the preset time length TSH is, for example, a value of three hours or the like, and can be appropriately set, depending on the season.

In step S15, the high pressure hot water usage control section 430A starts a timer t. In step S16, using the data map 430a, the high pressure hot water usage control section 430A performs control of atomizing high pressure hot water, corresponding to an atmospheric temperature $T_{Air}$, an atmospheric pressure, a humidity, which are measured by the temperature sensor 143A, the pressure sensor 143B, and the humidity sensor 143C, a mega watt demand MWD, and the like {'control of atomizing high pressure hot water, corresponding to atmospheric temperature $T_{Air}$ and the like (control of $Q_{WH}$)'}.

Concretely, this control is performed by the above-described sub-mode A1, A2, or A3 in FIG. 4.

In step S17, the fuel atomization control section 450 performs control of the fuel atomization rate Gf. Then, in step S18, the high pressure hot water usage control section 430A checks by the timer t whether or not a preset time length TSH has elapsed. If the preset time length TSH has elapsed (Yes), the process proceeds to step S24, and if the preset time length TSH has not elapsed (Yes), the process returns to step S16.

When the process has moved from step S13 to step S19, the control mode determining section 425 sets a mode of using normal temperature water. Then, the setting signal is input to the high pressure hot water usage control section 430A and normal temperature water usage control section 440A.

In step S20, the high pressure hot water usage control section 430A starts the timer t. In step S21, using the data map 440a, normal temperature water usage control section 440A performs control of atomizing normal temperature water, corresponding to an atmospheric temperature $T_{Air}$, an atmospheric pressure, a humidity, a mega watt demand MWD, and the like which are measured by the temperature sensor 143A, the pressure sensor 143B, and the humidity sensor 143C {'control of atomizing normal temperature water, corresponding to atmospheric temperature $T_{Air}$ etc. (control of $Q_{WC}$)'}. Further, herein, the high pressure hot water usage control section 430A performs control to generate high pressure hot water and store the high pressure hot water in the thermal storage 40 or performs control not to generate high pressure hot water, depending on the situation.

Concretely, this control is performed by the above-described sub-mode B1 or B2 in FIG. 4.

In step S22, the fuel atomization control section 450 performs control of the fuel atomization rate Gf. In step S23, normal temperature water usage control section 440A checks whether or not the preset time length TSH has elapsed by the timer t. If the preset time length TSH has elapsed (Yes), the process proceeds to step S24, and if the preset time length TSH has not elapsed (Yes), the process returns to step S21.

In step S24, the high pressure hot water usage control section 430A or the normal temperature water usage control section 440A terminates the control mode of atomizing high pressure hot water or normal temperature water.

At a timing when the present flowchart has been completed, the flow rate adjusting valves 24B, 29, and 43 having been opened are closed and the pumps 22B and 42 having been operated are stopped so that fluid is not supplied to the atomizing base pipe 31A nor the atomizing base pipe 31B.

Step S12 of the flowchart corresponds to 'high-pressure-hot-water storage-amount obtaining unit' in claims.

Figure 7:
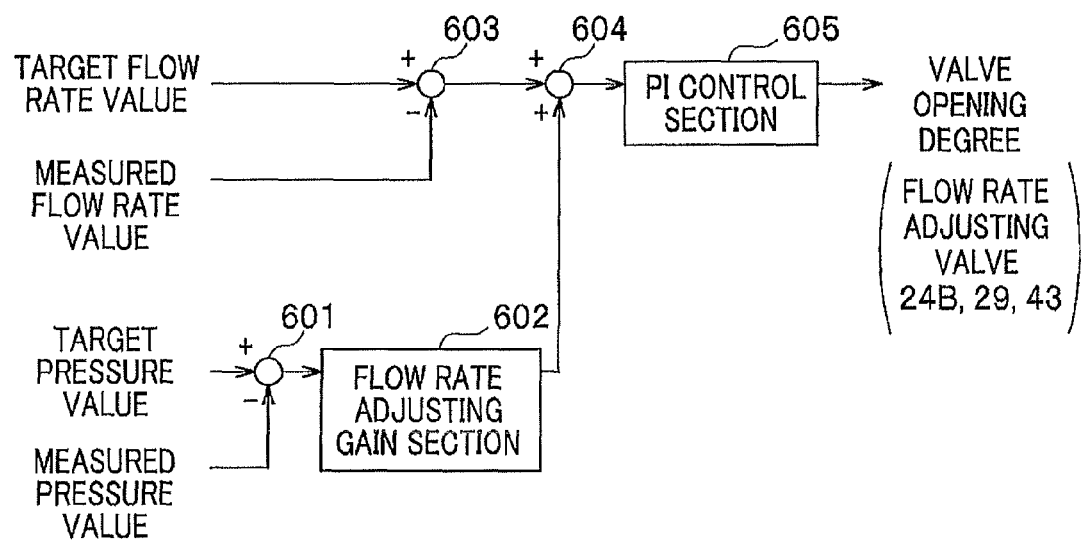
FIG. 7 illustrates control logic of flow rate adjusting valves 24B, 29, and 43.

In the following, referring to FIG. 7, logic of controlling the flow rate adjusting valves 24B, 29, and 43 will be described. FIG. 7 illustrates control logic of flow rate adjusting valves 24B, 29, and 43, which are omitted in FIG. 2. A demanded pressure value and a measured pressure value are input to a subtractor 601 so that the subtractor 601 computes a deviation; the deviation computed by the subtractor 601 is multiplied by a certain gain value by a flow rate adjusting gain section 602 so that an increased or decreased value of flow rate is computed; and the computed increased or decreased value of flow rate is input to an adder 604. A demanded flow rate value and a measured flow rate value are input to the subtractor 603 so that the subtractor 603 computes a deviation, and the computed deviation is input to the adder 604. The adder 604 adds the increased or decreased value of flow rate computed by the flow rate adjusting gain section 602 and the deviation computed by the subtractor 603, and a result is input to a PI control section 605. The PI control section 605 sets and outputs valve opening degrees. Thus, the opening degrees of the flow rate adjusting valves 24B, 29, and 43 can be easily controlled.

Monitoring Screen

In the following, referring to FIG. 8, description will be made on a plant monitoring screen 801 and a solar heat using status display screen 803 which are displayed on the display device of the console 400b by the plant monitoring section 428 in FIG. 2. FIG. 8 illustrates screens displayed on the display device of the console of the gas turbine system, wherein (a) illustrates an example of a motoring screen and (b) illustrates an example of a screen displaying the status of using solar heat.

Figure 8A:
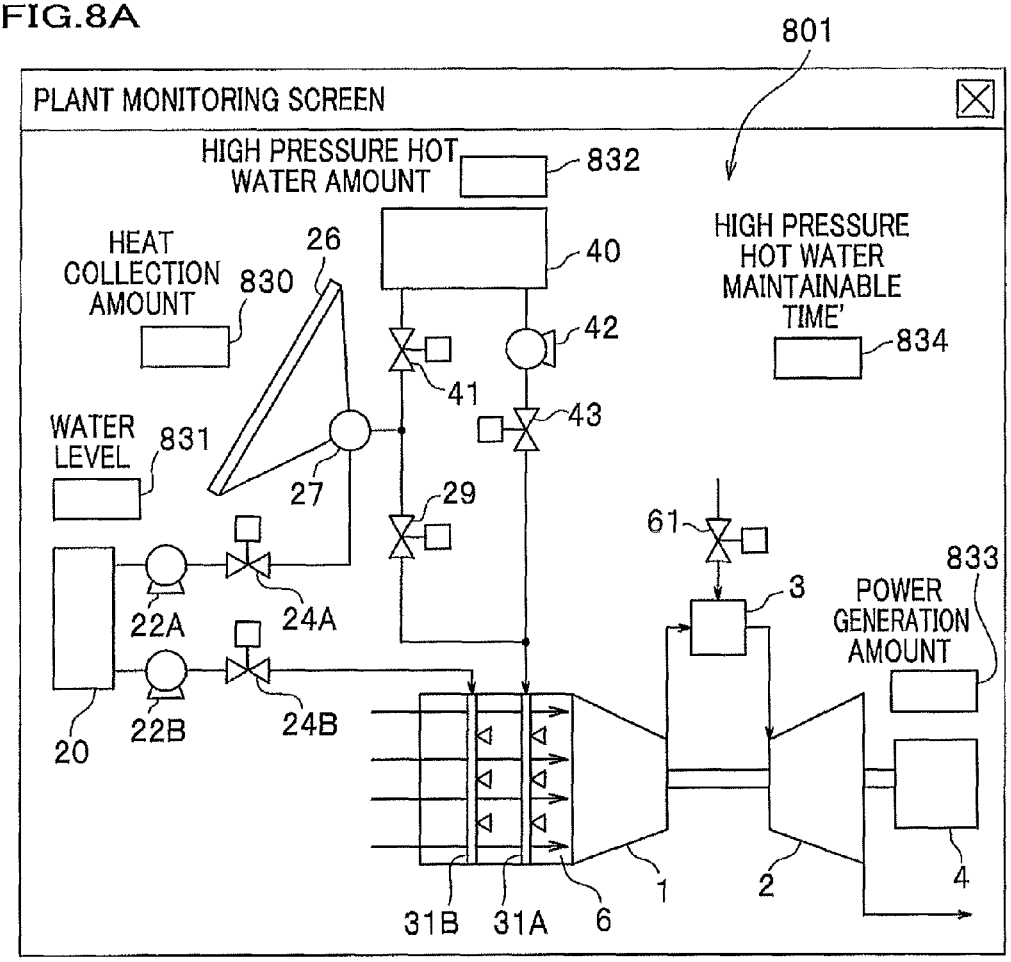
FIG. 8 illustrate screens displayed on the display device of the console of the gas turbine system, wherein (a) illustrates an example of a motoring screen and (b) illustrates an example of a screen displaying a status of using solar heat.

As shown in FIG. 8(a), an outline system diagram of the gas turbine system 500A shown in FIG. 1 is displayed on the plant monitoring screen 801. In the outline system diagram, elements are shown with the same reference symbols as those in FIG. 1 and description overlapping with the description of FIG. 1 will be omitted.

As shown in FIG. 8(a), the plant monitoring section 428 is provided with a heat collection amount display field 830 indicated as 'heat collection amount', a water level display section 831 for the water tank 20 indicated as 'water level', a high pressure hot water amount display field 832 for the thermal storage 40 indicated as 'high pressure hot water amount', an output display field 833 indicated as 'power generation amount', and a high pressure hot water suppliable time display field 834 indicated as 'high pressure hot water maintainable time'. A value displayed in the heat collection amount display field 830 represents a high pressure hot water generation rate (kg/sec) computed by the heat collection amount computing section 427. This value is displayed, for example, in conversion to 150° C. A water level is displayed as the water level (unit: m) itself of the water tank 20 or as the stored water amount (unit: ton) of the tank. A high pressure hot water amount is displayed as the storage amount (unit: ton) of high pressure hot water converted, for example, to high pressure hot water with a temperature of 150° C. A power generation amount is displayed as the output (unit: MWe) that is currently generated by the generator 4 and detected by the output sensor 171 for detecting the power generation amount. A high pressure hot water maintainable time represents a result computed by the high-pressure-hot-water suppliable-time estimating section 423 in the control shown in the flowchart in FIGS. 5 to 7.

In addition to the items described in FIG. 8(a), it is also possible, as necessary, the temperatures, the pressures, and the like of fluid in the respective pipes 30A, 30B, 47, the solar collecting tube 27 (see FIG. 1), and the thermal storage 40 on the plant monitoring screen 801.

Figure 8B:
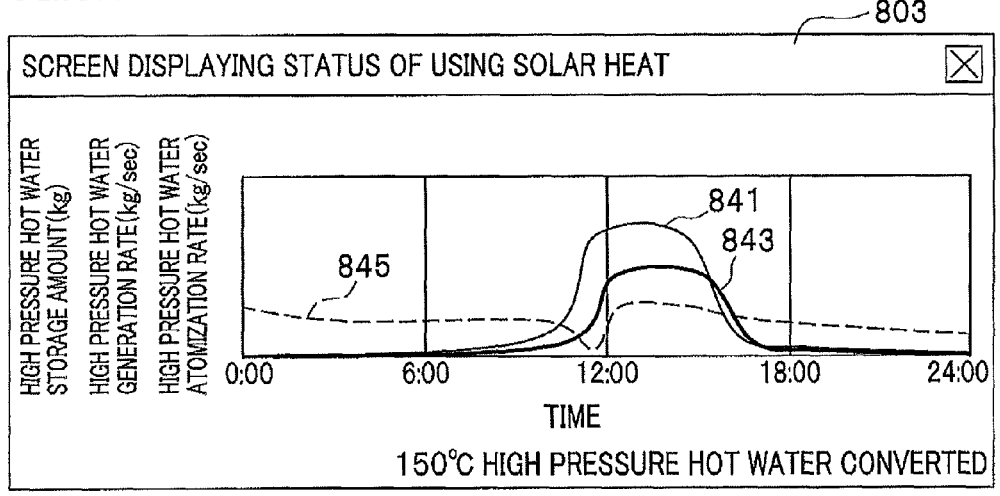

Further, as shown in FIG. 8(b), with the horizontal axis as time on the current day and the vertical axis as high pressure hot water atomization rate (kg/sec), high pressure hot water generation rate (kg/sec), and high pressure hot water storage amount (kg), there are displayed a curve 841 representing the temporal transition of the high pressure hot water generation rate, a curve 843 representing the temporal transition of the high pressure hot water atomization rate, and a curve 845 representing the temporal transition of the storage amount of high pressure hot water.

Herein, as an example, these parameters are displayed as enthalpy and density of hot water with a temperature of 150° C. converted from a result of 'volume×enthalpy', for unified display in a high pressure hot water state at a temperature of 150° C.

Though not described in FIG. 8(*b*) in the present embodiment, it is also possible to add functions to compute the advantage of cost reduction obtained by using solar heat and amount reduction of $CO_2$, into the control device 400A, and display a computation result of these on the display device.

In such a manner, in the present embodiment, the control device 400A displays operational status of a plant, such as a time length for which high pressure hot water can be supplied and a usage status of solar heat, and thereby assists plant monitoring by the operator with an advantage of reducing monitoring labor.

According to the present embodiment, as high pressure hot water, which decreases the inlet temperature of intake air of the compressor 1, is atomized from the atomizing nozzles 32A (see FIG. 1) of the atomizing base pipe 31A of the atomiser 300A, the high pressure hot water is completely evaporated by flashing, which does not generate liquid droplets having bad effects that causes erosion of the compressor 1. Further, by using solar heat energy as energy for generating high pressure hot water, output of the gas turbine system 500A can be improved without increasing the amount of $CO_2$, which is a greenhouse effect gas, and a gas turbine system 500A which is desirable in terms of environment conservation can be provided.

However, when the solar radiation amount of the sun S (see FIG. 1) temporally varies within a day, the generation rate of high pressure hot water by the solar collector 200 also varies. According to the present embodiment, there is provided a function to respond to variation in the generation rate of high pressure hot water caused by variation in the solar radiation amount during a day. That is, on a day or in a time period in which the solar radiation amount is high, it is possible to store surplus high pressure hot water in the thermal storage 40, and use the high pressure hot water stored in the thermal storage 40 on a day or in a time period in which the solar radiation amount is low.

Further, when the solar radiation is low and high pressure hot water is not stored in the thermal storage 40, it is possible to pressure-feed normal temperature water in the water tank 20 and atomize the normal temperature water from the atomizing nozzles 32B (see FIG. 1) of the atomizing base pipe 31B of the atomiser 300A. By atomizing normal temperature water, the advantage of increasing the output can be obtained. For example, even at night time, in case that the value of the mega watt demand MWD of generation power is high at sultry night, it is possible to obtain the advantage of increasing the output by atomizing normal temperature water. In this case, as the normal temperature water is atomized from the atomizing nozzles 32B of the atomizing base pipe 31B disposed on the upstream side, along the air intake duct 6, away from the compressor 1, it is possible to obtain a time period during which liquid droplets are evaporated inside the air intake duct 6 and the particle diameters of the droplets become smaller. Still further, by arranging the shapes of the atomizing holes of the atomizing nozzles 32B and those of the atomizing nozzles 32A such that liquid droplet diameters from the atomizing nozzles 32B become smaller than those from the atomizing nozzles 32A, the possibility of erosion of the compressor 1 can be reduced.

Accordingly, even in a case that the solar collector 200 (see FIG. 1) for generating high pressure hot water cannot be used for maintenance, atomization to intake air can be performed with normal temperature water by issuing an instruction, from the console 400b (see FIG. 2) to the control mode switching section 421, that only the sub-mode B2 of using normal temperature water is operable and thus sets control so that the other sub-modes A1-A3, nor B1 cannot be used.

Particularly, in case that the gas turbine system 500A is installed in an environment where sand or dust tends to scatter, such as in the Middle East, cleaning of the solar collector 200 is necessary. Even during a time for maintenance in such a case, a drop in the output of the gas turbine system 500A can be reduced by cooling the intake air of the compressor 1.

Further, in the present embodiment, based on the time length obtained by the high-pressure-hot-water suppliable-time estimating section 423, the control mode A of atomizing high pressure hot water or the control mode B of atomizing normal temperature water is selected by the control mode determining section 425. Piping systems to be used are different between a case of atomizing high pressure hot water and a case of atomizing normal temperature water. Accordingly, if the two modes are frequently switched to each other, it causes disturbance, which is undesirable in terms of operation of the gas turbine system 500A. In the present embodiment, the control mode determining section 425 determines the control mode A or the control mode B, and switching between the control modes A and B can be thereby inhibited for the preset time (TSH). Thus, the frequency of occurrence of disturbance to the gas turbine system 500A can be reduced.

Incidentally, in the steps S07-S13 of the flowchart shown in FIGS. 5 to 6 in the present embodiment, based on weather forecast information, estimated and computed are a high pressure hot water generation rate $G_{WHe}$ (t), an atmospheric temperature $T_{Aire}$ (t), and a high pressure hot water atomization rate $Q_{WHe}$ (t), and a result is used, however, the invention is not limited thereto. Using a high pressure hot water generation rate $G_{WH}$, an atmospheric temperature $T_{Air}$ measured by the temperature sensor 143A, and a high pressure hot water atomization rate $Q_{WH}$ required based on the atmospheric temperature $T_{Air}$, which are values at a time when the process has proceeded to step S07, and assuming that these values last for the time length TSH, these values may be used for computation, taking the place of the high pressure hot water generation rate $G_{WHe}$ (t), the atmospheric temperature $T_{Aire}$ (t), and the high pressure hot water atomization rate $Q_{WHe}$ (t). Further, in this case, the value of TSH is preferably set to a shorter time length, one hour for example, to make it possible to follow variation in the sunlight amount.

Further, in the present embodiment, an arrangement has been made such that there are provided a thermal storage 40 and a thermal-storage high-pressure-hot-water supply system that supplies high pressure hot water stored in the thermal storage 40 to the atomizing nozzles 32A of the atomizing base pipe 31A for atomizing the high pressure hot water into the intake air taken in by the compressor 1, however, the invention is not limited thereto. An arrangement may be made such that the thermal storage 40 is not provided and mere high pressure hot water generated by the solar collector 200 is supplied to the atomizing nozzles 32A of the atomizing base pipe 31A through the flow rate adjusting valve 29 and the pipe 30A. In this case, the high-pressure-hot-water suppliable-time estimating section 423 of the control device 400A predicts and computes a time length for which the solar collector 200 satisfies a predetermined high pressure hot water atomization rate, from the current generation rate of high pressure hot water by the solar collector 200, or also taking into account of future variation in the generation rate of high pressure hot water by the solar collector 200, and the high-pressure-hot-water suppliable-time estimating section 423 determines whether or not the predicted and computed time exceeds the preset time length TSH. A control mode is output by a signal to the control mode determining section 425 so that if the time length satisfying the certain high pressure hot water atomization rate exceeds the preset time length TSH, control by the sub-mode A1 (see FIG. 4) of supplying high pressure hot water from the solar collector 200 to the atomizing base pipe 31A of the atomiser 300A is set, and if not, control by the sub-mode B2 (see FIG. 4) of supplying normal temperature water to the atomizing base pipe 31B of the atomiser 300A is set.

Incidentally, in such a case that a thermal-storage high pressure-hot-water supply system is not provided, the control modes A and B in FIG. 4 respectively include only the sub-modes A1 and B2.

Second Embodiment

In the following, a gas turbine system 500B in a second embodiment according to the present invention will be described, referring to FIGS. 9 to 13. Difference from the first embodiment is that the gas turbine device 100A is replaced by a gas turbine device 100B and the control device 400A is replaced by a control device 400B.

Particularly, the gas turbine device 100B is different in that an atomiser 300B for atomizing high pressure hot water or normal temperature water into an air intake duct 6 is provided instead, and is configured the same as the gas turbine device 100A in other points.

The same reference symbols will be assigned to the same elements as those in the first embodiment, and description overlapping with the first embodiment will be omitted.

Figure 9:
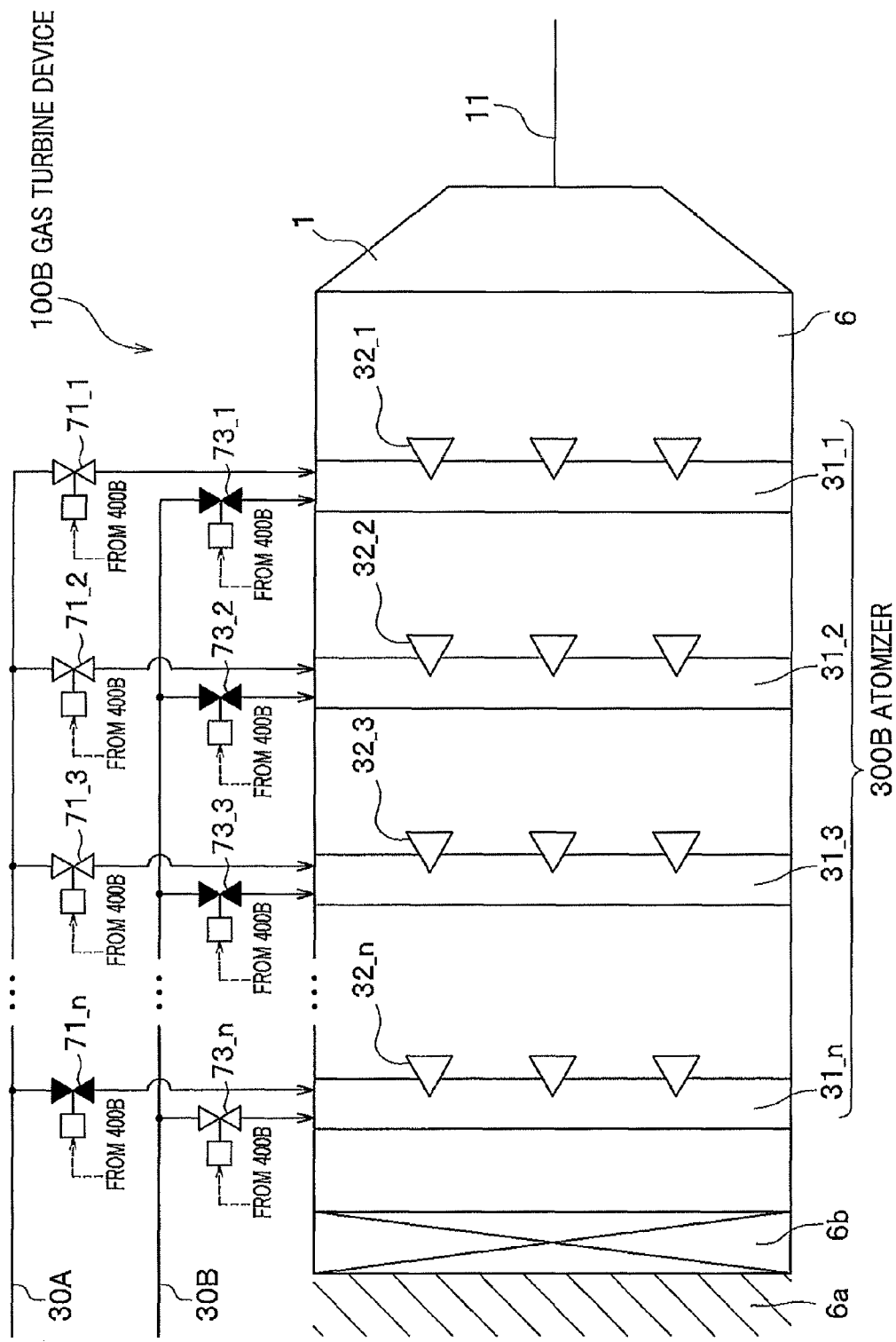
FIG. 9 shows arrangement of atomizing base pipes provided for the air intake duct of the compressor of a gas turbine system and pipes for supplying high pressure hot water or normal temperature water to the atomizing base pipe in a second embodiment according to the present invention.

FIG. 9 shows arrangement of atomizing base pipes provided for the air intake duct of the compressor of the gas turbine system and pipes for supplying high pressure hot water or normal temperature water to the atomizing base pipe in the second embodiment according to the present invention. As shown in FIG. 9, for the atomiser 300B, atomizing base pipes 31 are arranged in n stages as represented by reference symbols 31_1, 31_2, 31_3, . . . , and 31_*n* from the compressor 1 inlet side of an air intake duct 6 toward the upstream side along the flow of intake air. The distances between the respective stages along the direction of the intake air are desirable equal. The atomizing base pipes 31_1, 31_2, 31_3, . . . , 31_*n* are provided with respective atomizing nozzles 32_1. 32_2, 32_3, . . . , and 32_*n* in a plural number in a grid form. These atomizing nozzles 32_1. 32_2, 32_3, . . . , and 32_*n* in the plural number are desirably disposed with deviation from each other rather than being disposed at the same positions on a cross-sectional plane perpendicular to the flow of the intake air.

This is because if liquid droplets of normal temperature water atomized from the atomizing nozzles 32 of the atomizing pipes on the upstream stages hit the atomizing nozzles 32 on the downstream stages to become large liquid droplets and are sucked by the compressor 1, the large liquid droplets tend to cause erosion.

As shown in FIG. 9, a pipe 30A is connected with the respective atomizing base pipes 31_1, 31_2, 31_3, . . . , and 31_*n* through opening-closing valves (switching units) 71_1, 71_2, 71_3, . . . , and 71_*n*, which are on-off valves, and a pipe 30B is also connected with the respective atomizing base pipes 31_1, 31_2, 31_3, . . . , and 31_*n* through opening-closing valves (switching units) 73_1, 73_2, 73_3, . . . , and 73_*n*, which are on-off valves. Though not shown in FIG. 9, the opening-closing valves 71_1, 71_2, 71_3, . . . , 71_*n*, 73_1, 73_2, 73_3, . . . , and 73_*n* are provided with valve on-off detecting sensors for detecting ON/OFF states of the respective valves, the detected ON/OFF states being input to the control device 400B.

Control Device

Figure 10:
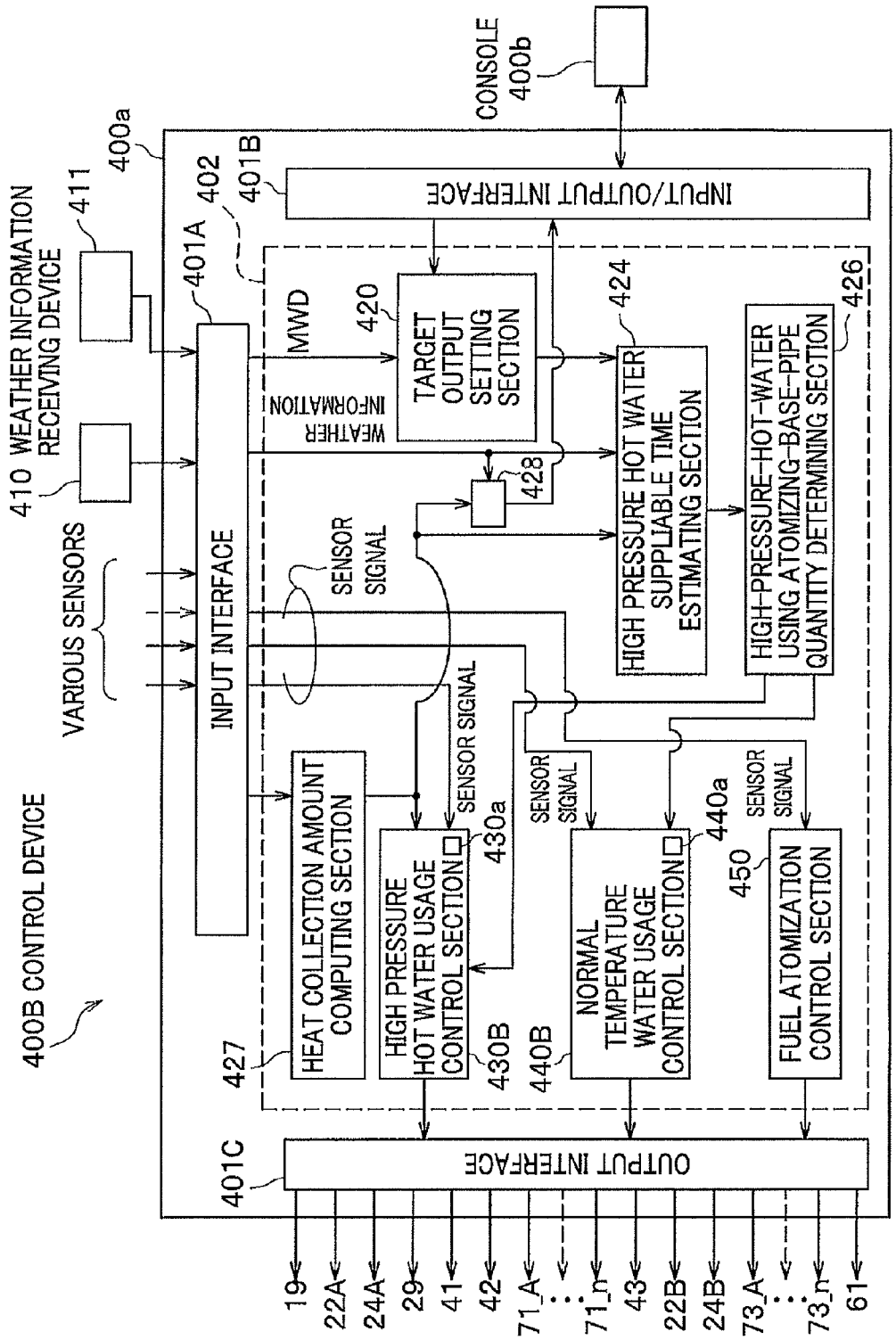
FIG. 10 shows a function block configuration of the control device for the gas turbine system in the second embodiment.

In the following, the functional configuration of the control device 400B will be described, referring to FIG. 10. FIG. 10 shows a function block configuration of the control device for the gas turbine system in the second embodiment.

The same reference symbols will be assigned to the same elements as those of the control device 400A in the first embodiment, and overlapping description will be omitted.

The control device 400B in the present embodiment is different from the control device 400A in the first embodiment in that when the generation rate of high pressure hot water by the solar collector 200 or the amount of high pressure hot water stored in the thermal storage 40 is insufficient for the required preset time length TSH for continuous atomizing high pressure hot water, the control device 400B performs control to atomize a certain amount of high pressure hot water from the atomiser 300B into the air intake duct 6 and atomize normal temperature water to cover the shortage.

A control device main body 400*a* includes, for example, an input interface 401A, an input/output interface 401B, an output interface 401C, a CPU 402, a ROM, a RAM, a hard disk storage device and the like, which are not shown. Programs and data, not shown, stored in the hard disk storage device are read out and executed by the CPU 402, to thereby realize later-described respective functional configurations.

Measurement signals are input to the input interface 401A from the various kinds of sensors, which are the same as those described above in the first embodiment in FIG. 1, and further, signals from the valve ON-OFF detection sensors for detecting ON-OFF states of the above-described opening-closing valves 71_1, 71_2, 71_3, . . . , 71_*n*, 73_1, 73_2, 73_3, . . . , and 73_*n* are also input.

An output interface 401C outputs opening-closing control signals to the opening-closing valve 19 (see FIG. 1) and the on-off valves 71_1, 71_2, 71_3, . . . , 71_*n*, 73_1, 73_2, 73_3, . . . , and 73_*n*, which are on-off valves, outputs opening degree control signals to flow rate adjusting valves 24A, 29, 41, 43, 24B, and 61 (see FIG. 1), and outputs control signals of starting, stopping, and rotational speed to the pumps 22A, 22B, and 42 (see FIG. 1).

As functional configurations of the CPU 402, as shown in FIG. 10, mainly included are a demanded output setting section 420, a high-pressure-hot-water suppliable-time estimating section (high-pressure-hot-water atomizing-stage-quantity setting unit) 424, a high-pressure-hot-water-using atomizing-base-pipe-quantity determining section (high-pressure-hot-water atomizing-stage-quantity setting unit) 426, a heat collection amount computing section (high-pressure-hot-water generation-rate obtaining unit) 427, a plant monitoring section 428, a high pressure hot water usage control section (supply amount setting unit) 430B, a normal temperature water usage control section (supply amount setting unit) 440B, and a fuel atomization control section 450.

In the present embodiment, the heat collection amount computing section 427 computes the generation rate of high pressure hot water by the solar collector 200, and inputs the computed generation rate to the high-pressure-hot-water suppliable-time estimating section 424, the plant monitoring section 428, and the high pressure hot water usage control section 430B.

The high-pressure-hot-water suppliable-time estimating section 424 computes a high pressure hot water suppliable time length TSHX on the assumption that all of high pressure hot water is supplied to the atomiser 300B and then atomized, based on a high pressure hot water generation rate $G_{WHe}$ (t) by the solar collector 200 predicted from weather information, a high pressure hot water amount St0 stored in the thermal storage 40, and an atomization rate $Q_{WHe}$ (t) of high pressure hot water as a predicted value that is mainly defined by a required mega watt demand MWD and an atmospheric temperature $T_{Air}$ (t) predicted from weather information.

Then, if the high pressure hot water suppliable time length TSHX input from the high-pressure-hot-water suppliable-time estimating section 424 is shorter than a preset time TSH of high pressure hot water, the high-pressure-hot-water-using atomizing-base-pipe-quantity determining section 426 sets a quantity p of stages of atomizing base pipes 31 enabling continuous atomizing of high pressure hot water for the preset time length TSH by atomizing high pressure hot water from the atomiser 300B for a part of a required high pressure hot water atomization rate, and inputs the quantity p to the high pressure hot water usage control section 430B and the normal temperature water usage control section 440B.

The high pressure hot water usage control section 430B performs control of atomizing high pressure hot water, according to the quantity p of stages of atomizing base pipes 31 for atomizing high pressure hot water, the quantity p having been input from the high-pressure-hot-water-using atomizing-base-pipe-quantity determining section 426, according to parameters such as the current atmospheric temperature $T_{Air}$, and using a quantity of stages of atomizing base pipes of the maximum quantity p or a smaller quantity of stages, depending on the capacity of the atomization rate FA per stage of the atomizing base pipes 31.

Herein, the atomization rate FA is a value (unit: kg/sec) determined in advance by the shape of the atomizing holes of the atomizing nozzles 32 of the atomizing base pipes 31 and the number of atomizing nozzles 32, and is set and determined in advance such that liquid droplets become evaporated or small enough by flashing when high pressure hot water is atomized.

The normal temperature water usage control section 440B performs control to atomize normal temperature water from the atomiser 300B by setting the quantity of atomizing base pipes 31, corresponding to the capacity of the atomization rate FB per stage of the atomizing base pipes 31, so as to atomize normal temperature water that is corresponding to the shortage with the atomization rate $Q_{WH}$ of high pressure hot water that is atomized under control by the high pressure hot water usage control section 430B.

Herein, the atomization rate FB is a value (unit: kg/sec) determined in advance by the shape of the atomizing holes of the atomizing nozzles 32 of the atomizing base pipes 31 and the quantity of atomizing nozzles 32, and is set and determined in advance as a value at which liquid droplets are not excessively large nor frozen when normal temperature water is atomized.

Accordingly, in the present embodiment, while the high pressure hot water usage control section 430B performs operational control in one of the sub-modes A1, A2, and A3 of the control mode B in FIG. 4, the normal temperature water usage control section 440B performs operational control in the sub-mode B2 in parallel.

Figure 11:
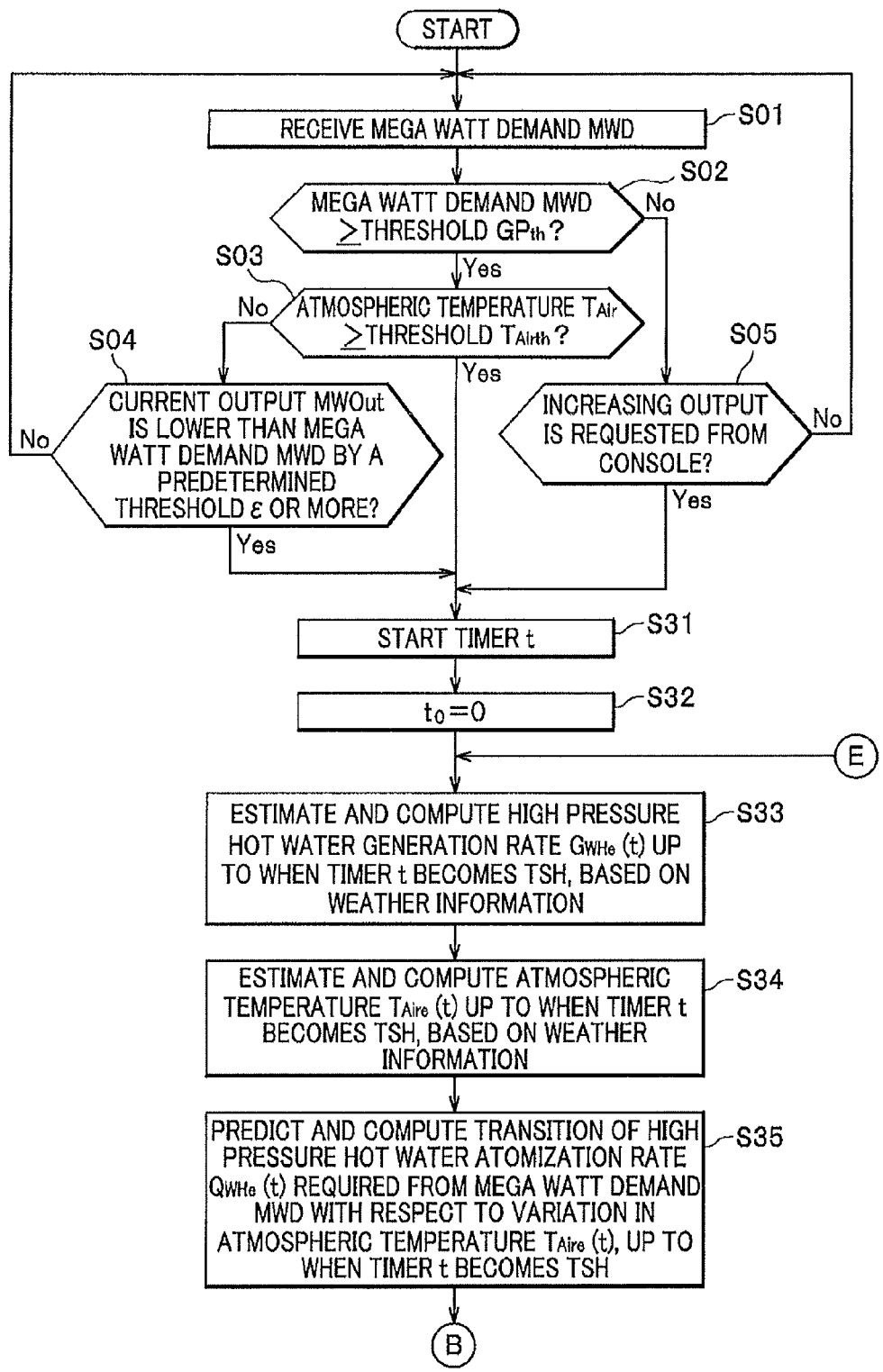
FIG. 11 is a flowchart showing the flow of control in a control mode of using high pressure hot water in the second embodiment.
Figure 12:
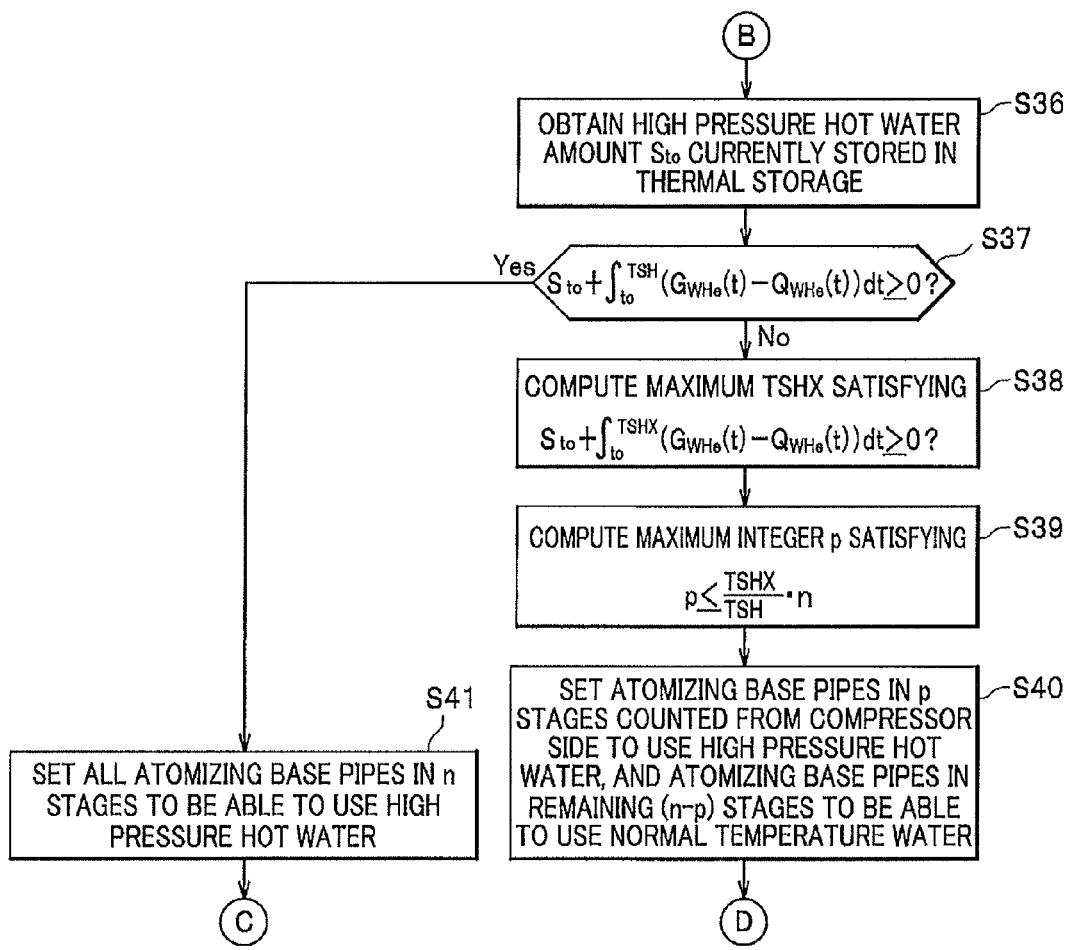
FIG. 12 is the flowchart continued from FIG. 11.
Figure 13:
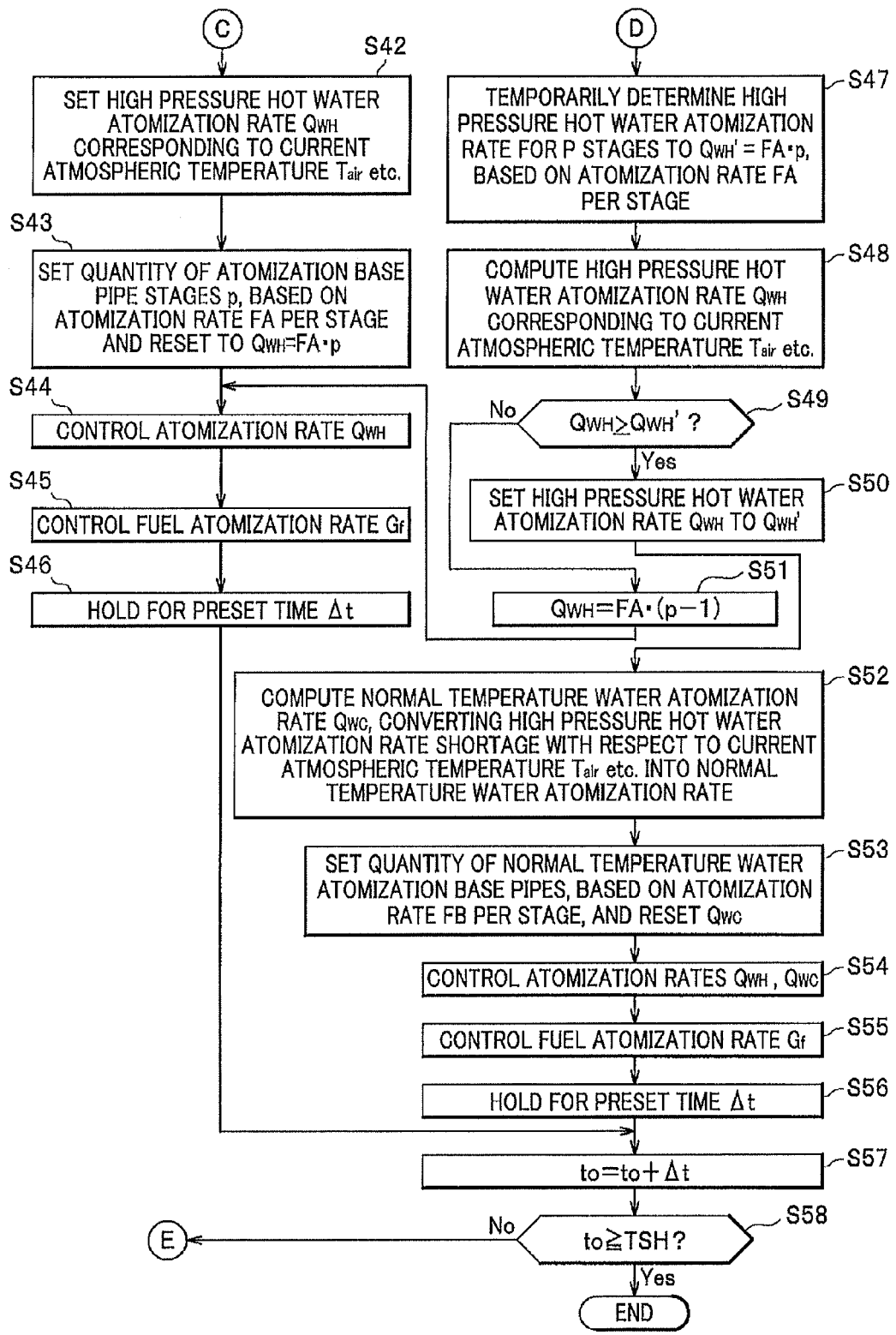
FIG. 13 is the flowchart continued from FIG. 12.

In the following, the detailed functions of the high-pressure-hot-water suppliable-time estimating section 424, the high-pressure-hot-water-using atomizing-base-pipe-quantity determining section 426, the heat collection amount computing section 427, the high pressure hot water usage control section 430B, and the normal temperature water usage control section 440B will be described, using the flowchart shown in FIGS. 11 to 13. FIGS. 11 to 13 show a flowchart representing the flow of control of control modes of using high pressure hot water in the second embodiment.

The processes in steps S01 to S05, steps S31 to S38, S57, and S58 are performed by the high-pressure-hot-water suppliable-time estimating section 424. Steps S39 to S41 are controlled by the high-pressure-hot-water-using atomizing-base-pipe-quantity determining section 426. Steps S42 to S44, S46, and S47 to S51 are controlled by the high pressure hot water usage control section 430B. Steps S52 to S54, and S56 are controlled by the normal temperature water usage control section 440A.

Steps S01 to S05 in FIG. 11 are the same as those in the first embodiment, and description of these will be omitted.

However, 'the high-pressure-hot-water suppliable-time estimating section 423' should be read as 'high-pressure-hot-water suppliable-time estimating section 424', and if Yes in steps S03, S04, or S05, the process proceeds to step S31.

In step S31 the high-pressure-hot-water suppliable-time estimating section 424 starts the timer t. In step S32, the high-pressure-hot-water suppliable-time estimating section 424 sets the timer t as t0=0. In step S33, based on weather information (weather forecast information) from the weather information receiving device 410 (see FIG. 10), the high-pressure-hot-water suppliable-time estimating section 424 estimates and computes high pressure hot water generation rate $G_{WHe}$ (t) up to the time when the timer t becomes TSH. Concretely, regarding the high pressure hot water generation rate $G_{WH}$ having been input from the heat collection amount computing section 427, the current value of forecasted value of sunlight amount of the weather forecast information and the sunlight amount from the light amount sensor 142 are compared; a correction coefficient on the transition of forecasted value of sunlight amount is computed; the transition of forecasted value (weather information) of sunlight amount is multiplied by the current high pressure hot water generation rate $G_{WH}$ and the above-described correction coefficient; and a future high pressure hot water generation rate $G_{WHe}$ (t) can thus be estimated and computed.

Incidentally, herein, for simplification of control, the high pressure hot water generation rate $G_{WHe}$ (t) is computed, for example, with conversion to 150° C.

In step S04, future atmospheric temperature $T_{Aire}$ (t) is estimated and computed up to the time when the timer t becomes TSH, based on the weather information (weather forecast information) from the weather information receiving device 410. Concretely, the atmospheric temperature $T_{Air}$ being input from the temperature sensor 143A, which is currently measuring the atmospheric temperature, and the current value of forecasted value of atmospheric temperature of the weather forecast information are compared; a correction coefficient on the transition of forecasted value of atmospheric temperature is computed; the transition of forecasted value (weather information) of atmospheric temperature is multiplied by the above-described correction coefficient; and a future atmospheric temperature $T_{Aire}$ (t) can be thus estimated and computed.

In step S35, transition of high pressure hot water atomization rate $Q_{WHe}$ (t), which is required by a mega watt demand MWD, with respect to the future variation in atmospheric temperature $T_{Aire}$ (t) having been estimated and computed in step S34 is predicted and computed up to the time when the timer t becomes TSH. Subsequent to step S35, the process proceeds to step S36 in FIG. 12, according to a connector (B).

Incidentally, herein, for simplification of control, the high pressure hot water atomization rate $Q_{WHe}$ (t) is computed, for example, with conversion to 150° C.

In step S36, a high pressure hot water amount St0 currently stored in the thermal storage 40 (see FIG. 1) is obtained, for example, with conversion to 150° C., from a water level signal, a temperature signal, and a pressure signal from the water level sensor 145A (see FIG. 1), the temperature sensor 145B (see FIG. 1), and the pressure sensor 145C (see FIG. 1) provided in the thermal storage 40.

In step S37, it is checked whether or not the following Expression (3) is satisfied. If Yes in step S37, the process proceeds to step S41, and if No, the process proceeds to step S38.

$$S_{t0} + \int_{t0}^{TSH}(G_{WHe}(t) - Q_{WHe}(t)) \geq 0 \quad (3)$$

$$S_{t0} + \int_{t0}^{TSH}(G_{WHe}(t) - Q_{WHe}(t))dt \geq 0 \quad (3)$$

In step S38, the maximum TSHX satisfying the following Expression (4) is computed.

$$S_{t0} + \int_{t0}^{TSHX}(G_{WHe}(t) - Q_{WHe}(t)) \geq 0 \quad (4)$$

$$S_{t0} + \int_{t0}^{TSHX}(G_{WHe}(t) - Q_{WHe}(t))dt \geq 0 \quad (4)$$

In step S39, the high-pressure-hot-water-using atomizing-base-pipe-quantity determining section 426 computes the maximum integer p satisfying $p \leq \{(TSHX)/(TSH)\} \cdot n$. Herein, n is the quantity n of stages of all the atomizing base pipes 31 described above.

In step S40, the high-pressure-hot-water-using atomizing-base-pipe-quantity determining section 426 performs setting such that atomizing base pipes 31 in p stages counted from the compressor 1 side use high pressure hot water and the atomizing base pipes 31 in the remaining (n−p) stages can use normal temperature water. The high-pressure-hot-water-using atomizing-base-pipe-quantity determining section 426 inputs the quantity p of stages of atomizing base pipes 31 to the high pressure hot water usage control section 430B, and inputs the quantity (n−p) of stages of atomizing base pipes 31 to the normal temperature water usage control section 440B.

Subsequent to step S40, the process proceeds to step S47 in FIG. 13, according to a connector (D).

When the process proceeds to step S41 subsequent to Yes in step S37, the atomizing base pipes 31 in all stages n are set to be able to atomize high pressure hot water. The high-pressure-hot-water-using atomizing-base-pipe-quantity determining section 426 inputs the quantity n of stages of atomizing base pipes 31 to the high pressure hot water usage control section 430B, and inputs a quantity 0 of stages of atomizing base pipes 31 to the normal temperature water usage control section 440B. Subsequent to step S41, the process proceeds to step S42 in FIG. 13, according to a connector (C).

In step S42, using the data map 430a, the high pressure hot water usage control section 430B computes and sets an atomization rate $Q_{WH}$ of high pressure hot water that is corresponding to an atmospheric temperature $T_{Air}$, an atmospheric pressure, a humidity, which are measured by the temperature sensor 143A, the pressure sensor 143B, and the humidity sensor 143C, a mega watt demand MWD, and the like {'setting an atomization rate $Q_{WC}$ of high pressure hot water, corresponding to the current atmospheric temperature $T_{Air}$ etc.'}. In step S43, based on the atomization rate FA per stage of atomizing base pipes 31, the high pressure hot water usage control section 430B sets a quantity p of stages of atomizing base pipes and resets the atomization rate $Q_{WH}$ to $Q_{WH}$=FA·p.

In step S44, the high pressure hot water usage control section 430B controls the atomization rate $Q_{WH}$. Concretely, this control is performed in one of the sub-modes A1, A2, and A3 in FIG. 4 described above.

In step S45, the fuel atomization control section 450 controls the fuel atomization rate Gf. In step S46, control in steps S44 and S45 is held for a certain time Δt. The certain time Δt is approximately 10 to 30 minutes. Subsequent to step S46, the process proceeds to step S57.

In step S47, the high pressure hot water usage control section 430B temporarily determines an atomization rate of high pressure hot water for p stages of atomizing base pipes 31, based on the atomization rate FA per stage ($Q_{WH}$=FA·p). In step S48, using the data map 430a, the high pressure hot water usage control section 430B computes an atomization rate $Q_{WH}$ of high pressure hot water, corresponding to an atmospheric temperature $T_{Air}$, an atmospheric pressure, a humidity, which are measured by the temperature sensor 143A, the pressure sensor 143B, and the humidity sensor 143C, a mega watt demand MWD, and the like {'computing an atomization rate $Q_{WC}$ of high pressure hot water, corresponding to the current atmospheric temperature $T_{Air}$ etc.'}. In step S49, it is checked whether $Q_{WH} \geq Q_{WH'}$. If Yes in step S49, the process proceeds to step S50, and $Q_{WH'}$ is set as the atomization rate of high pressure hot water. Subsequently, the process proceeds to step S52. If No in step S49, the process proceeds to step S51, and the high pressure hot water atomization rate is set to $Q_{WH}$=FA·(p−1). Subsequently, the process proceeds to step S44. This flow to step S44 possibly occurs when the mega watt demand MWD has temporarily dropped from a value having been demanded up to then.

In step S52, the normal temperature water usage control section 440B computes a normal temperature water atomization rate $Q_{WC}$, converting the shortage of the high pressure hot water atomization rate with respect to the current atmospheric temperature $T_{Air}$ and the like into an atomization rate of normal temperature water. Concretely, the atomization rate by the difference between the high pressure hot water atomization rate $Q_{WH}$ having been computed in step S48 and the atomization rate $Q_{WH}$ (actually atomization rate $Q_{WH'}$) having been set in steps S47 and S50 is converted for normal temperature water, and thus a normal temperature water atomization rate $Q_{WC}$ is computed. As the enthalpy per kg of normal temperature water can be known from a temperature measurement value of normal temperature water from the temperature sensor 152C, this conversion to an atomization rate $Q_{WC}$ of normal temperature water corresponding to the above-described difference in the atomization rate of high pressure hot water can be easily done such that the atomization rate of normal temperature water is decreased by the difference from the enthalpy per kg of high pressure hot water with conversion to 150° C.

In step S53, the normal temperature water usage control section 440B sets a quantity of atomizing base pipes of normal temperature water, based on an atomization rate FB per stage of atomizing base pipe 31, then determines a quantity r of stages that does not exceed the atomization rate $Q_{WC}$ of normal temperature water having been set in step S52, and resets the atomization rate $Q_{WC}$ ($Q_{WC}$=FB·r). In step S54, the high pressure hot water usage control section 430B controls atomization rate $Q_{WH}$, and the normal temperature water usage control section 440B controls the atomization rate $Q_{WC}$ (control of atomization rates $Q_{WH}$ and $Q_{WC}$). In step S55, the fuel atomization control section 450 controls fuel atomization rate Gf. In step S56, the control in steps S54 and S55 is held for the certain time Δt. Subsequent to step S56, the process proceeds to step S57.

In step S57, after the certain time Δt has elapsed, the high-pressure-hot-water suppliable-time estimating section 424 sets t0=t0+Δt, and in step S58, checks whether or not t0 has become longer than or equal to the preset time length TSH.

If t0 has become longer than or equal to the preset time length TSH (Yes), control of atomizing high pressure hot water or normal temperature water is terminated, and if not (No), the process returns to step S33 in FIG. 11, according to a connector (E), to continue control of atomizing high pressure hot water or normal temperature water.

Incidentally, it is also possible that, by manual interruption, the operator operates the high-pressure-hot-water suppliable-time estimating section 424 and the high-pressure-hot-water-using atomizing-base-pipe-quantity determining section 426 at an arbitrary timing.

According to the present embodiment, even in case that a generation rate of high pressure hot water generated by the solar collector 200 is insufficient, namely, lower than the a certain atomization rate required to be atomized to intake air of the compressor 1, in parallel to atomizing high pressure hot water for a certain quantity of stages from atomizing base pipes 31 on the side near the compressor 1, normal temperature water is atomized from atomizing base pipes 31 which are on the upstream side along the flow of intake air and are different from the atomizing base pipes 31 for atomizing high pressure hot water. As a result, more flexibly than the case of the first embodiment, control can be performed such that high pressure hot water generated by solar heat is used as soon as possible, and occurrence of loss accompanying thermal radiation can be reduced by storing high pressure hot water in the thermal storage 40.

Further, based on an estimated and computed high pressure hot water generation rate $G_{WHe}(t)$ by the solar collector 200, a storage amount St0 of high pressure hot water in the thermal storage 40, and transition of high pressure hot water atomization rate $Q_{WHe}(t)$ required by mega watt demand MWD with respect to variation in future atmospheric temperature $T_{Aire}(t)$, the high-pressure-hot-water suppliable-time estimating section 424 and the high-pressure-hot-water-using atomizing-base-pipe-quantity determining section 426 compute the quantity of stages of atomizing base pipes 32 that can atomize high pressure hot water to cover a preset time Δt, and determine atomizing nozzles 32 which are controlled to atomize high pressure hot water. The high pressure hot water usage control section 430B sets a supply amount of high pressure hot water to be supplied to the atomiser 300B, corresponding to the computed quantity of stages of atomizing base pipes controlled to atomize high pressure hot water. Further, the normal temperature water usage control section 440B sets a supply amount of normal temperature water in case that the supply amount of high pressure hot water to be supplied to the atomiser 300B is insufficient. As a result, as it is possible to fix the number of stages of atomizing base pipes 32 controlled to atomize high pressure hot water for a preset time Δt, it is prevented that high pressure hot water is used too quickly and water is atomized from a mid-time only from atomizing base pipes 32 for atomizing normal temperature water, and the possibility of erosion of the compressor 1 caused by atomizing normal temperature water from atomizing base pipes 32_1 near the inlet side of the compressor 1 can be reduced.

REFERENCE SYMBOLS

1 . . . compressor
2 . . . gas turbine
3 . . . combustor
4 . . . generator
6 . . . air intake duct
21A . . . pipe
21B . . . pipe
22A . . . pump
22B . . . pump
23A . . . pipe
23B . . . pipe
24A . . . flow rate adjusting valve
24B . . . flow rate adjusting valve
25A . . . pipe
26 . . . light collecting plate
27 . . . solar collecting tube
28 . . . pipe
29 . . . flow rate adjusting valve
30A . . . pipe
30B . . . pipe
31 (31_1, 31_2, 31_3, . . . , 31_n), 31A, and 31B . . . atomizing base pipe
32 ((31_1, 31_2, 31_3, . . . , 31_n), 32A, and 32B . . . atomizing nozzle
40 . . . thermal storage
41 . . . flow rate adjusting valve
42 . . . pump
43 . . . flow rate adjusting valve
45 . . . pipe
46 . . . pipe
47 . . . pipe
71_1, 71_2, 71_3, . . . , 71_n . . . opening-closing valve (switching unit)
73_1, 73_2, 73_3, . . . , 73_n . . . opening-closing valve (switching unit)
100A, 100B . . . gas turbine device
141A . . . temperature sensor
142 . . . light amount sensor
143A . . . temperature sensor
200 . . . solar collector
300A, 300B . . . atomiser
400A, 400B . . . control device
400a . . . control device main body
410 . . . weather information receiving device
411 . . . power feeding instruction receiving device
420 . . . demanded output setting section
421 . . . control mode switching section
423 . . . high-pressure-hot-water suppliable-time estimating section
424 . . . high-pressure-hot-water suppliable-time estimating section
425 . . . control mode determining section
426 . . . high-pressure-hot-water-using atomizing-base-pipe-quantity determining section
427 . . . heat collection amount computing section
428 . . . plant monitoring section
430 . . . high pressure hot water control section
430A . . . high pressure hot water usage control section
430B . . . high pressure hot water usage control section (supply amount setting unit)
430a . . . data map
440A . . . normal temperature water usage control section
440B . . . normal temperature water usage control section (supply amount setting unit)
440a . . . data map
500A and 500B . . . gas turbine system

The invention claimed is:
1. A gas turbine system having a compressor for compressing intake air and discharging the air, a combustor for mixing and combusting the air discharged from the compressor and fuel, and a gas turbine driven by combustion gas from the combustor, the gas turbine system comprising:
a high pressure hot water atomizing system using solar heat, wherein the atomizing system generates high pres- sure hot water by a solar collector using solar heat energy and atomizes the high pressure hot water from an atomizing nozzle into the air taken in by the compressor; and a normal temperature water atomizing system that atomizes normal temperature water from an atomizing nozzle into the air taken in by the compressor.

2. The gas turbine system according to claim 1, wherein the high pressure hot water atomizing system using solar heat includes:

a thermal storage for storing high pressure hot water generated by the solar collector, thermally maintaining the high pressure hot water; and a thermal storage high pressure hot water supply system for supplying the high pressure hot water stored in the thermal storage to the atomizing nozzle for atomizing the high pressure hot water into the air taken in by the compressor.

3. A control device for controlling operation of a gas turbine system, wherein the gas turbine system includes:

a compressor for compressing intake air and discharging the air;

a combustor for mixing and combusting the air discharged from the compressor and fuel;

a gas turbine driven by combustion gas from the combustor;

a high pressure hot water atomizing system using solar heat, wherein the atomizing system generates high pressure hot water by a solar collector using solar heat energy and atomizes the high pressure hot water from an atomizing nozzle into the air taken in by the compressor; and a normal temperature water atomizing system that atomizes normal temperature water from an atomizing nozzle into the air taken in by the compressor, the control device comprising:

a high-pressure-hot-water generation-rate obtaining unit that measures a generation rate of high pressure hot water obtained by the solar collector; and an atomizing control mode determining unit that, based on at least a current generation rate of high pressure hot water, the current generation rate being obtained by the high-pressure-hot-water generation-rate obtaining unit, determines switching between a high pressure hot water atomizing mode of atomizing high pressure hot water from the high pressure hot water atomizing system using solar heat and a normal temperature water atomizing mode of atomizing normal temperature water from the normal temperature water atomizing system.

4. The control device, for controlling operation of a gas turbine system, according to claim 3, wherein the high pressure hot water atomizing system, using solar heat, of the gas turbine system includes:

a thermal storage for storing high pressure hot water generated by the solar collector, thermally maintaining the high pressure hot water; and a thermal storage high pressure hot water supply system for supplying the high pressure hot water stored in the thermal storage to the atomizing nozzle for atomizing the high pressure hot water into the air taken in by the compressor, wherein the control device comprises:

a high-pressure-hot-water storage-amount obtaining unit for obtaining a storage amount of high pressure hot water stored in the thermal storage, and wherein the atomizing control mode determining unit, based on at least a current generation rate of high pressure hot water, the current generation rate being obtained by the high-pressure-hot-water generation-rate obtaining unit, and a storage amount of high pressure hot water obtained by the high-pressure-hot-water storage-amount obtaining unit, determines switching between the high pressure hot water atomizing mode and the normal temperature water atomizing mode.

5. The control device, for controlling operation of a gas turbine system, according to claim 3, wherein the high pressure hot water atomizing system, using solar heat, of the gas turbine system includes:

a thermal storage for storing high pressure hot water generated by the solar collector, thermally maintaining the high pressure hot water; and a thermal storage high pressure hot water supply system for supplying the high pressure hot water stored in the thermal storage to the atomizing nozzle for atomizing the high pressure hot water into the air taken in by the compressor, wherein the control device includes:

a high-pressure-hot-water storage-amount obtaining unit for obtaining a storage amount of high pressure hot water stored in the thermal storage; and further a weather information obtaining unit for obtaining forecasted weather information, and wherein the atomizing control mode determining unit:

predicts and computes a time length for which atomization into intake air of the compressor can be performed at a certain atomization rate, based on at least weather information obtained by the weather information obtaining unit, a current generation rate of high pressure hot water, the current generation rate being obtained by the high-pressure-hot-water generation-rate obtaining unit, a predicted generation rate of high pressure hot water, and a storage amount of high pressure hot water obtained by the high-pressure-hot-water storage-amount obtaining unit; and determines to apply the high pressure hot water atomizing mode when the predicted and computed time length is longer than or equal to a preset threshold time length and determines to apply the normal temperature water atomizing mode when the predicted and computed time length is shorter than the preset threshold time length.

6. The control device, for controlling operation of a gas turbine system, according to claim 3, wherein the high pressure hot water atomizing system, using solar heat, of the gas turbine system includes:

a thermal storage for storing high pressure hot water generated by the solar collector, thermally maintaining the high pressure hot water; and a thermal storage high pressure hot water supply system for supplying the high pressure hot water stored in the thermal storage to the atomizing nozzle for atomizing the high pressure hot water into the air taken in by the compressor, wherein the control device includes:

a high-pressure-hot-water storage-amount obtaining unit for obtaining a storage amount of high pressure hot water stored in the thermal storage, wherein the atomizing control mode determining unit:

predicts and computes a time length for which atomization into intake air of the compressor can be performed at a certain atomization rate, based on at least a current generation rate of high pressure hot water, the current generation rate being obtained by the high-pressure-hot-water generation-rate obtaining unit, and a storage amount of high pressure hot water obtained by the high-pressure-hot-water storage-amount obtaining unit;
determines to apply the high pressure hot water atomizing mode when the predicted and computed time length is longer than or equal to a preset threshold time length and determines to apply the normal temperature water atomizing mode when the predicted and computed time length is shorter than the preset threshold time length; and
displays on a display device a result of predicting and computing a time length for which atomization into the compressor can be performed at a certain atomization rate.

7. A control method for a gas turbine system, wherein the gas turbine system includes at least:
   a compressor for compressing intake air and discharging the air;
   a combustor for mixing and combusting the air discharged from the compressor and fuel;
   a gas turbine driven by combustion gas from the combustor;
   an atomiser, the atomiser being installed inside an air intake chamber on an upstream side of the compressor, for atomizing water to air to be supplied to the compressor so that a temperature of the air to be supplied to the compressor decreases;
   a high pressure hot water supply piping that includes a solar collector for generating high pressure hot water by heating water to be supplied to the atomiser to a temperature higher than a temperature of the air to be supplied to the compressor, using solar heat; and
   a normal temperature water supply piping for supplying normal temperature water to the atomiser,
   wherein the gas turbine system includes a control device for controlling operation of the gas turbine system,
   wherein the control device includes:
   a high-pressure-hot-water generation-rate obtaining unit that measures a generation rate of high pressure hot water generated by the solar collector; and
   an atomizing control mode determining unit that, based on a current generation rate of high pressure hot water, the rate being obtained by the high-pressure-hot-water generation-rate obtaining unit, determines switching between a high pressure hot water atomizing mode of supplying high pressure hot water from the high pressure hot water supply piping using solar heat to the atomiser and a normal temperature water atomizing mode of supplying normal temperature water from the normal temperature water supply system to the atomiser,
   and wherein the atomizing control mode determining unit:
   predicts and computes a time length for which the solar collector can generate high pressure hot water that can be atomized at a certain atomization rate into intake air for the compressor, based on the current generation rate of high pressure hot water obtained by the high-pressure-hot-water generation-rate obtaining unit; and
   determines to apply the high pressure hot water atomizing mode when the predicted and computed time length is longer than or equal to a preset threshold time length, and determines to apply the normal temperature water atomizing mode when the predicted and computed time length is shorter than the preset threshold time length.

8. The control method, for a control device for a gas turbine system, according to claim 7,
   wherein the gas turbine system further includes:
   a thermal storage for storing high pressure hot water generated by the solar collector, thermally maintaining the high pressure hot water; and
   a high pressure hot water supply piping for supplying the high pressure hot water stored in the thermal storage to the atomiser,
   wherein the control device includes:
   a high-pressure-hot-water storage-amount obtaining unit for obtaining a storage amount of high pressure hot water stored in the thermal storage,
   and wherein the atomizing control mode determining unit:
   predicts and computes a time length for which atomization into intake air of the compressor can be performed at a certain atomization rate, based on a current generation rate of high pressure hot water, the current generation rate being obtained by the high-pressure-hot-water generation-rate obtaining unit, and a storage amount of high pressure hot water obtained by the high-pressure-hot-water storage-amount obtaining unit; and
   determines to apply the high pressure hot water atomizing mode when the predicted and computed time length is longer than or equal to a preset threshold time length, and determines to apply the normal temperature water atomizing mode when the predicted and computed time length is shorter than the preset threshold time length.

9. A gas turbine system having a compressor for compressing intake air and discharging the air; a combustor for mixing and combusting the air discharged from the compressor and fuel; and a gas turbine driven by combustion gas from the combustor;
   the gas turbine system comprising:
   an atomiser, the atomiser being installed inside an air intake chamber on an upstream side of the compressor, for atomizing water to air to be supplied to the compressor so that a temperature of the air to be supplied to the compressor decreases;
   a high pressure hot water supply piping that includes a solar collector for generating high pressure hot water by heating water to be supplied to the atomiser to a temperature higher than a temperature of the air to be supplied to the compressor, using solar heat;
   a thermal storage for storing high pressure hot water generated by the solar collector, the thermal storage thermally maintaining the high pressure hot water, and a stored high pressure hot water supply piping for supplying the high pressure hot water stored in the thermal storage to the atomiser;
   a normal temperature water supply piping for supplying normal temperature water to the atomiser, as necessary; and
   a control device for controlling operation of the gas turbine system,
   wherein the atomiser includes:
   atomizing base pipes for atomizing the high pressure hot water or the normal temperature water from atomizing nozzles thereof into the air intake chamber, the atomizing base pipes being arranged along an air intake direction in the air intake chamber in plural stages; and
   a switching unit for switching between supply of the high pressure hot water and supply of the normal temperature water under control by the control device in supplying the high pressure hot water or the normal temperature water to the atomizing base pipes,
   and wherein the control device controls respective flow rates in the high pressure hot water supply piping using solar heat, the stored high pressure hot water supply piping, and the normal temperature water supply piping to thereby control supply amounts of the high pressure hot water and the normal temperature water, and controls the switching unit, corresponding to the respective supply amounts of the high pressure hot water and the normal temperature water, to thereby perform switching setting of the high pressure hot water and the normal temperature water to be supplied to the atomizing base pipes on the respective stages of the atomizing base pipes.

10. A control device for the gas turbine system according to claim 9, comprising:
a high-pressure-hot-water generation-rate obtaining unit for measuring a generation rate of high pressure hot water generated by the solar collector;
a high-pressure-hot-water storage-amount obtaining unit for obtaining a storage amount of high pressure hot water stored in the thermal storage;
a high-pressure-hot-water atomizing-stage-quantity setting unit for setting a quantity of stages of atomizing base pipes, out of plural stages of atomizing base pipes, from which the high pressure hot water is to be atomized; and
a supply amount setting unit for setting respective supply amounts of the high pressure hot water and the normal temperature water to be supplied to the atomiser,
wherein, based on at least a current generation rate of high pressure hot water obtained by the high-pressure-hot-water generation-rate obtaining unit and a storage amount of high pressure hot water obtained by the high-pressure-hot-water storage-amount obtaining unit, the high-pressure-hot-water atomizing-stage-quantity setting unit computes a quantity of stages of atomizing base pipes capable of atomizing the high pressure hot water for a preset time and determines atomizing base pipes that are to atomize the high pressure hot water,
and wherein the supply amount setting unit sets the respective supply amounts of the high pressure hot water and the normal temperature water to be supplied to the atomiser, corresponding to the computed quantity of stages of atomizing base pipes.

11. The control device, for the gas turbine system, according to claim 10, wherein the high-pressure-hot-water atomizing-stage-quantity setting unit determines the atomizing base pipes to atomize the high pressure hot water, corresponding to the computed quantity of stages of atomizing base pipes, from a side of the atomizing base pipe that is the closest to the compressor.

12. A control method executed by the control device, according to claim 10, for the gas turbine system,
wherein the control device further includes a weather information obtaining unit for obtaining forecasted weather information,
wherein the high-pressure-hot-water atomizing-stage-quantity setting unit estimates and computes a future generation rate of high pressure hot water from the weather information obtained by the weather information obtaining unit and the current generation rate of high pressure hot water obtained by the high-pressure-hot-water generation-rate obtaining unit, computes a quantity of stages of atomizing base pipes capable of atomizing the high pressure hot water for a preset time, based on the estimated and computed high pressure hot water generation rate and the storage amount of high pressure hot water obtained by the high-pressure-hot-water storage-amount obtaining unit, and thereby determines atomizing base pipes to atomize the high pressure hot water,
and wherein the supply amount setting unit sets the respective supply amounts of the high pressure hot water and the normal temperature water to be supplied to the atomiser, corresponding to the computed quantity of stages of atomizing base pipes.

13. The control method, according to claim 12, for the gas turbine system, wherein the high-pressure-hot-water atomizing-stage-quantity setting unit determines the atomizing base pipes to atomize the high pressure hot water, corresponding to the computed quantity of stages of atomizing base pipes, from a side of the atomizing base pipe that is the closest to the compressor.

* * * * *